(12) United States Patent
Ohashi

(10) Patent No.: US 11,493,997 B2
(45) Date of Patent: Nov. 8, 2022

(54) PROGRAM, RECOGNITION APPARATUS, AND RECOGNITION METHOD

(71) Applicant: SONY CORPORATION, Tokyo (JP)

(72) Inventor: Takeshi Ohashi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/734,364

(22) PCT Filed: Jun. 6, 2019

(86) PCT No.: PCT/JP2019/022454
§ 371 (c)(1),
(2) Date: Dec. 2, 2020

(87) PCT Pub. No.: WO2019/244645
PCT Pub. Date: Dec. 26, 2019

(65) Prior Publication Data
US 2021/0165492 A1 Jun. 3, 2021

(30) Foreign Application Priority Data
Jun. 20, 2018 (JP) .............................. JP2018-116712

(51) Int. Cl.
*G06V 40/10* (2022.01)
*G06F 3/01* (2006.01)
*G06V 40/20* (2022.01)

(52) U.S. Cl.
CPC ............ *G06F 3/017* (2013.01); *G06V 40/107* (2022.01); *G06V 40/28* (2022.01)

(58) Field of Classification Search
CPC ...... G06F 3/017; G06F 3/0304; G06F 3/0346; G06F 3/042; G06K 9/00355;
(Continued)

(56) References Cited

U.S. PATENT DOCUMENTS

2010/0310136 A1* 12/2010 Tsuda .................. G06F 3/011
382/124
2015/0084885 A1* 3/2015 Kawamoto ............. G06F 3/038
345/173
(Continued)

FOREIGN PATENT DOCUMENTS

JP H06-318271 A 11/1994
JP 2012-248067 A 12/2012
(Continued)

OTHER PUBLICATIONS

Angga Rahagiyanto et al., Hand Gesture Classification for Sign Language Using Artificial Neural Network, Nov. 1, 2017, IEEE, pp. 1-5 (Year: 2017).*

(Continued)

*Primary Examiner* — Tam T Tran
(74) *Attorney, Agent, or Firm* — Paratus Law Group, PLLC

(57) ABSTRACT

There is provided a program, a recognition apparatus, and a recognition method that make it possible to improve a recognition accuracy of a hand recognition process. As a hand recognition process for recognizing, according to a posture of a portable terminal including an optical sensor that receives light, a hand reflected in an image obtained by sensing of the optical sensor, a hand recognition process for the left hand or a hand recognition process for the right hand is performed. The present technology can be applied to a case in which a hand is recognized.

8 Claims, 17 Drawing Sheets

(58) Field of Classification Search
CPC ............ G06K 9/00375; G06K 9/00389; A63F 13/211; A63F 13/213; A63F 13/65; A63F 13/837; A63F 13/92; G06T 7/00; H04M 1/00

See application file for complete search history.

(56) References Cited

U.S. PATENT DOCUMENTS

| | | | |
|---|---|---|---|
| 2016/0041721 A1* | 2/2016 | Fujii | G06T 15/20 |
| | | | 715/765 |
| 2016/0231807 A1* | 8/2016 | Ogasawara | H04N 5/23293 |
| 2017/0076139 A1* | 3/2017 | Park | G06F 3/0484 |

FOREIGN PATENT DOCUMENTS

| | | |
|---|---|---|
| JP | 2014-137646 A | 7/2014 |
| JP | 2015-524115 A | 8/2015 |
| JP | 2016-148900 A | 8/2016 |
| JP | 2018-092206 A | 6/2018 |

OTHER PUBLICATIONS

Jayaraman D et al., Nonspecific-User Hand Gesture Recognition By Using MEMS Accelerometer, Feb. 1, 2014, IEEE, pp. 1-6 (Year: 2014).*

* cited by examiner

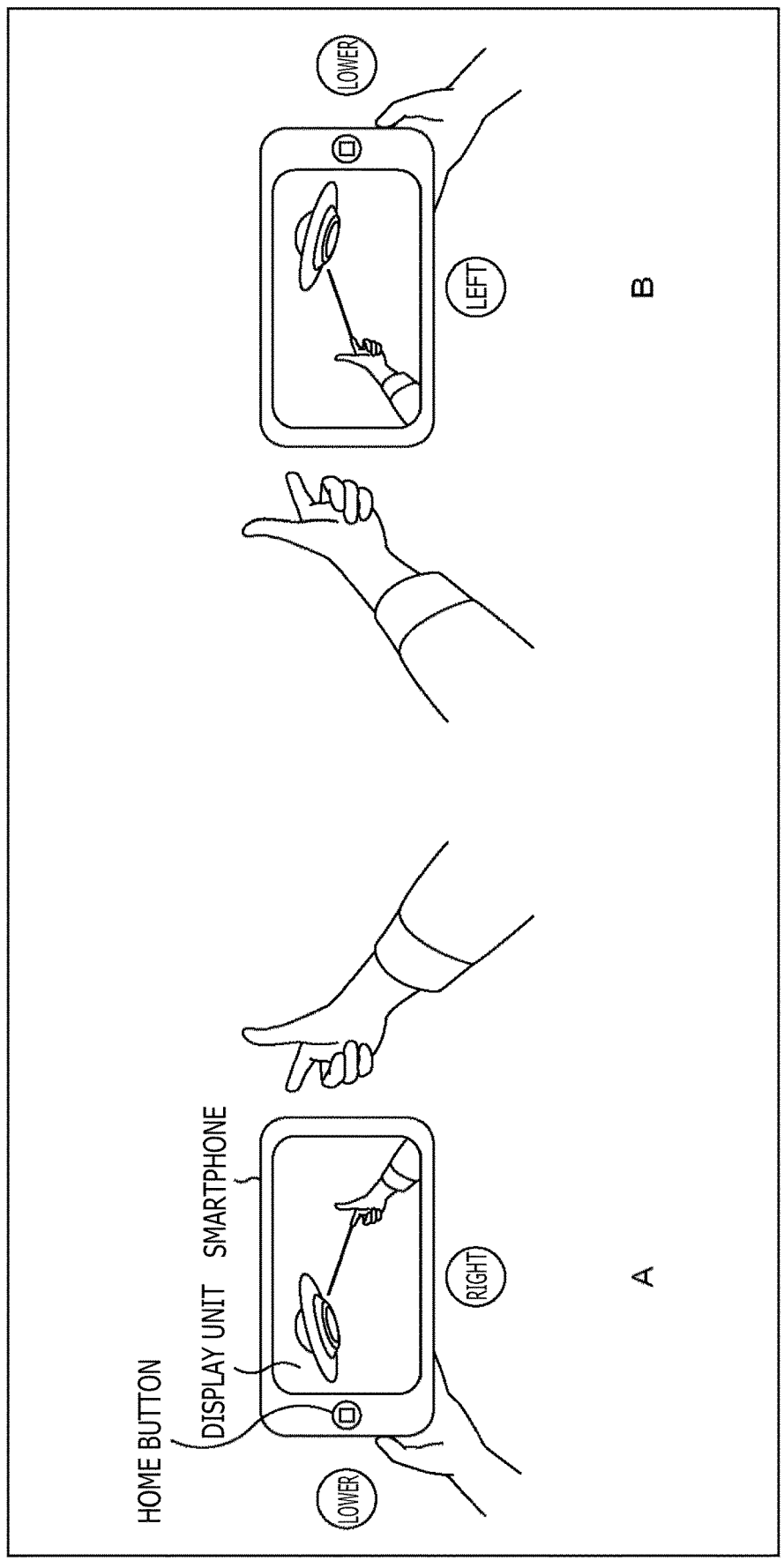

FIG. 7

| CONFIGURATION OF OPTICAL SENSOR | HAND RECOGNITION PROCESS FOR RIGHT HAND | HAND RECOGNITION PROCESS FOR LEFT HAND | |
|---|---|---|---|
| LINE SYMMETRIC CONFIGURATION | DICTIONARY FOR ONE HAND (RIGHT HAND) IS USED TO PERFORM HAND RECOGNITION PROCESS FOR SENSING IMAGE AS TARGET | DICTIONARY FOR ONE HAND IS USED TO PERFORM HAND RECOGNITION PROCESS FOR REVERSAL IMAGE OBTAINED BY LEFT AND RIGHT REVERSAL OF SENSING IMAGE AS TARGET | REVERSAL METHOD |
| LINE ASYMMETRIC CONFIGURATION | USE DICTIONARY FOR RIGHT HAND | USE DICTIONARY FOR LEFT HAND | DICTIONARY SELECTION METHOD |

FIG. 8
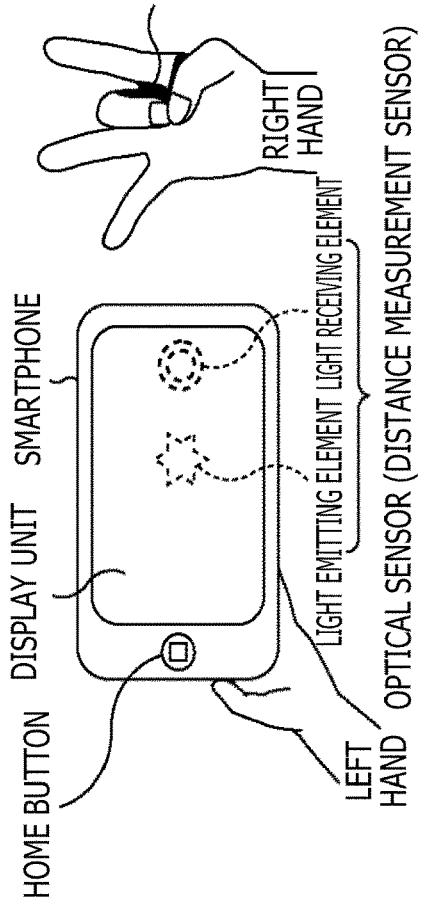
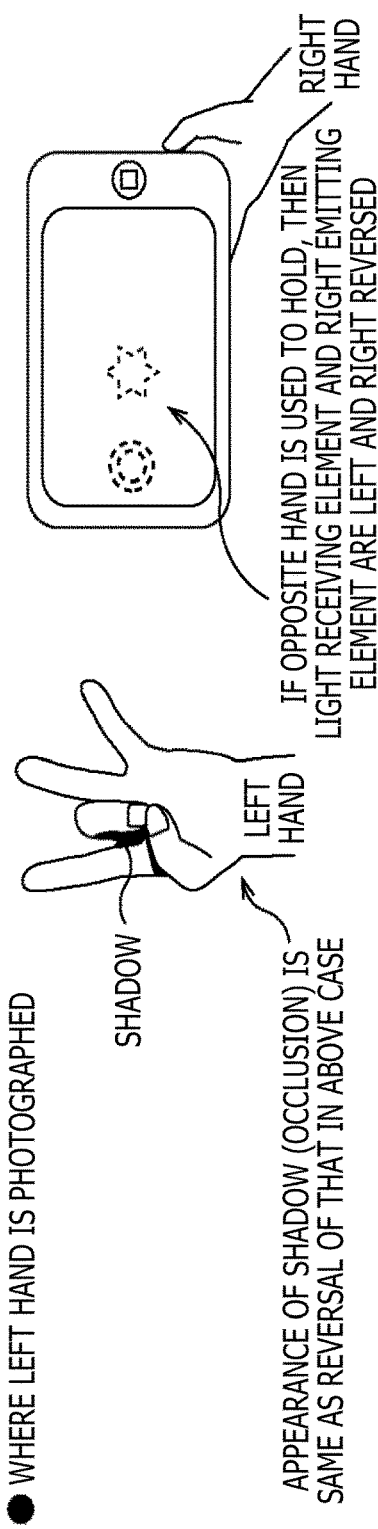

FIG. 9
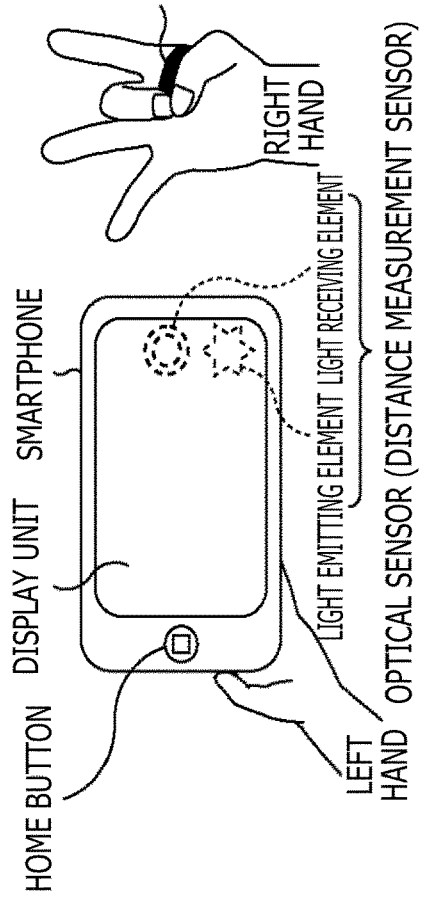
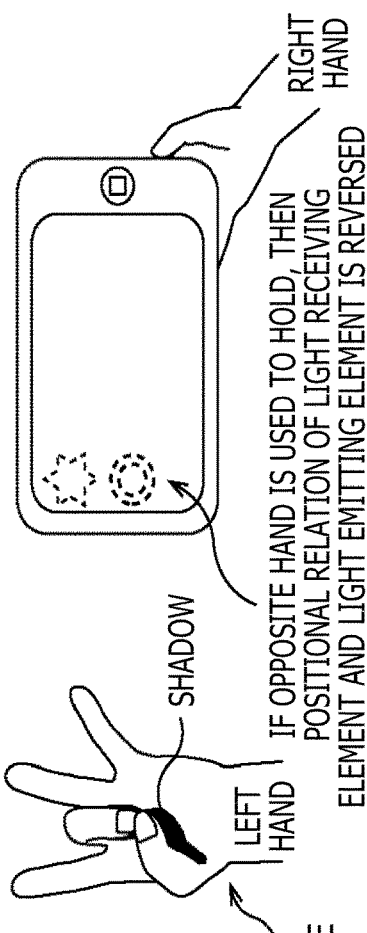

PROGRAM, RECOGNITION APPARATUS, AND RECOGNITION METHOD

CROSS REFERENCE TO PRIOR APPLICATION

This application is a National Stage Patent Application of PCT International Patent Application No. PCT/JP2019/022454 (filed on Jun. 6, 2019) under 35 U.S.C. § 371, which claims priority to Japanese Patent Application No. 2018-116712 (filed on Jun. 20, 2018), which are all hereby incorporated by reference in their entirety.

TECHNICAL FIELD

The present technology relates to a program, a recognition apparatus, and a recognition method, and specifically to a program, a recognition apparatus, and a recognition method that make it possible to improve a recognition accuracy, for example, of a hand recognition process.

BACKGROUND ART

For example, in a smartphone, a display image of a display unit is rotated according to a posture of the smartphone obtained using a built-in acceleration sensor (see PTL 1).

CITATION LIST

Patent Literature

[PTL 1]
JP 2014-137646A

SUMMARY

Technical Problem

For example, in an application that allocates various functions to hands of a user among applications for a portable terminal such as a smartphone, in order to activate a function according to a state of the hand, it is necessary to recognize the hand of the user. Accordingly, it is demanded to improve a recognition accuracy of a hand recognition process for recognizing a hand of a user.

The present technology has been made in view of such a situation as described above and makes it possible to improve a recognition accuracy of a hand recognition process.

Solution to Problem

A recognition apparatus or a program of the present technology is a recognition apparatus including a hand recognition processing unit configured to perform, as a hand recognition process for recognizing, according to a posture of a portable terminal including an optical sensor that receives light, a hand reflected in an image obtained by sensing of the optical sensor, a hand recognition process for a left hand or a hand recognition process for a right hand or a program for causing a computer to function as such a recognition apparatus as just described.

A recognition method of the present technology is a recognition method including a step of performing, as a hand recognition process for recognizing, according to a posture of a portable terminal including an optical sensor that receives light, a hand reflected in an image obtained by sensing of the optical sensor, a hand recognition process for a left hand or a hand recognition process for a right hand.

In the program, the recognition apparatus, and the recognition method of the present technology, as a hand recognition process for recognizing, according to a posture of a portable terminal including an optical sensor that receives light, a hand reflected in an image obtained by sensing of the optical sensor, a hand recognition process for a left hand or a hand recognition process for a right hand is performed.

It is to be noted that the recognition apparatus may be an independent apparatus or an internal block (a semiconductor chip, a module or the Like) that configures one apparatus.

Further, the program can be provided by transmitting it through a transmission medium or by recording it on a recording medium.

Advantageous Effect of Invention

According, to the present technology, a recognition accuracy of a hand recognition process can be improved.

It is to be noted that the effect described here is not necessarily restrictive, and some other effect described in the present disclosure may be applicable.

BRIEF DESCRIPTION OF DRAWINGS

FIG. 6 depicts views illustrating left and right hand decision of a smartphone to which the present technology is applied.

FIG. 7 is a view illustrating an example of a hand recognition process for a left hand and a hand recognition process for a right hand performed by the smartphone to which the present technology is applied.

FIG. 8 is a view illustrating an optical sensor of a line symmetric configuration.

FIG. 9 is a view illustrating a line asymmetric configuration.

DESCRIPTION OF EMBODIMENT

<Example of Smartphone Application that Allocates Various Functions to Hand of User>

Figure 1:
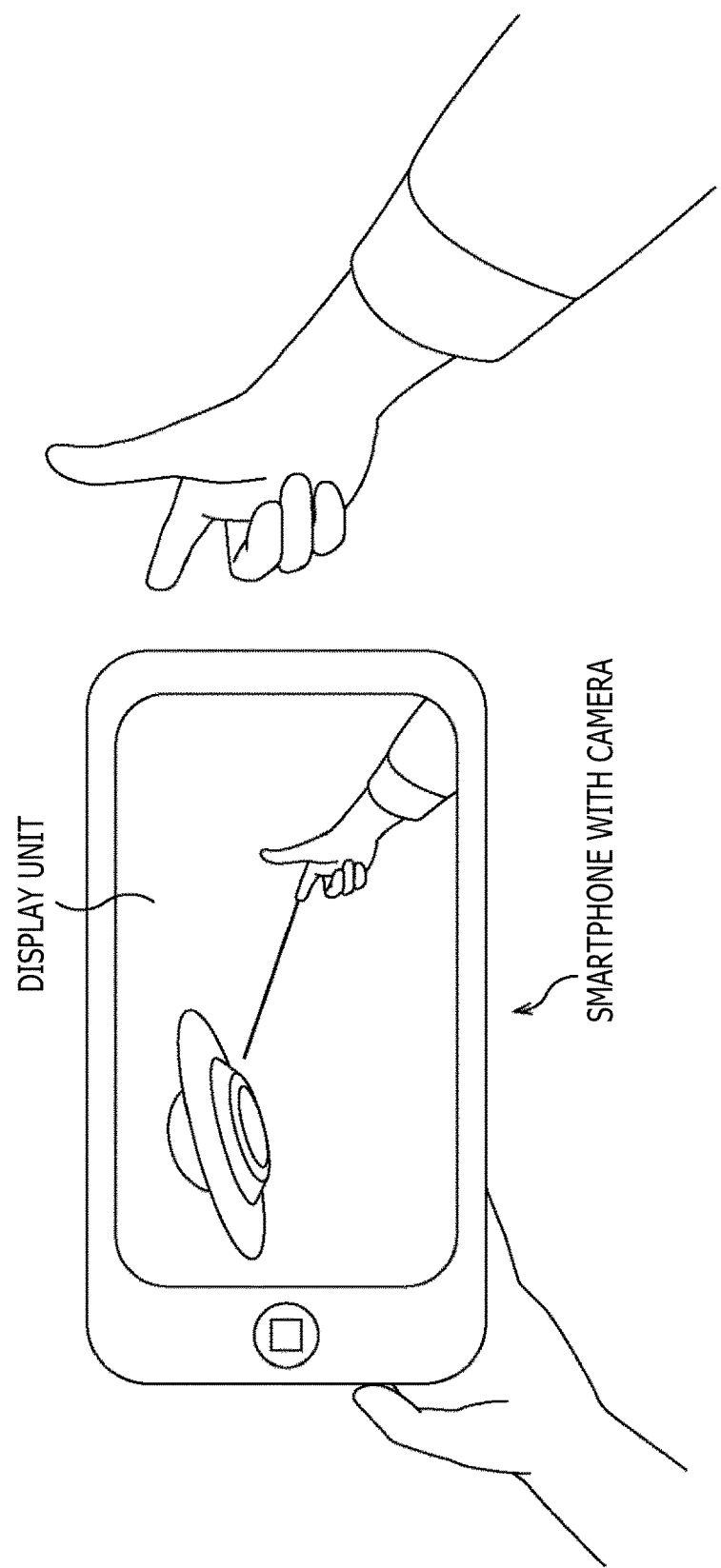
FIG. 1 is a view illustrating as example of an application for a smartphone for allocating various functions to a hand of a user.

FIG. 1 is a view illustrating a smartphone application that allocates various functions to a hand of a user.

In FIG. 1, the application (program) for a smartphone is an AR. (Augmented Reality) shooting game in which a function of a pistol or the like to a hand.

In the case where the user plays the application as the shooting game, the user would hold the smartphone, for example, in the left hand that is one of the left and right hands such that the display unit of the smartphone faces toward the user and the longitudinal direction of the smartphone is directed horizontally. Then, the user would reach out the right hand that is the other one of the left and right hands to a rear face side of the display unit of the smartphone and play the shooting game likening the right hand as a pistol or the like.

The application photographs the real world including the hands of the user with a camera (image sensor) as an optical sensor that is provided on the rear face side of the display unit of the smartphone and receives light and displays the real world on the display unit. Further, the application displays a character who becomes an enemy (In FIG. 1, a character that imitates a UFO (Unidentified Flying Object)).

In the case where the hand of the user photographed by the camera has a shape of a pistol, the application (displays such a CG (Computer Graphics) that) emits a beam from the tip of the forefinger of the pistol-shaped hand in synchronism with a movement of the thumb of the pistol-shaped hand. On the other hand, is the case where the hand of the user photographed by the camera has a paper shape, the application defends an attack from the enemy.

In the application as such a shooting game as described above, it is necessary to perform a hand recognition process for recognizing (the shape of) a hand of a user photographed by the camera of the smartphone.

<Overview of Hand Recognition Process>

Figure 2:
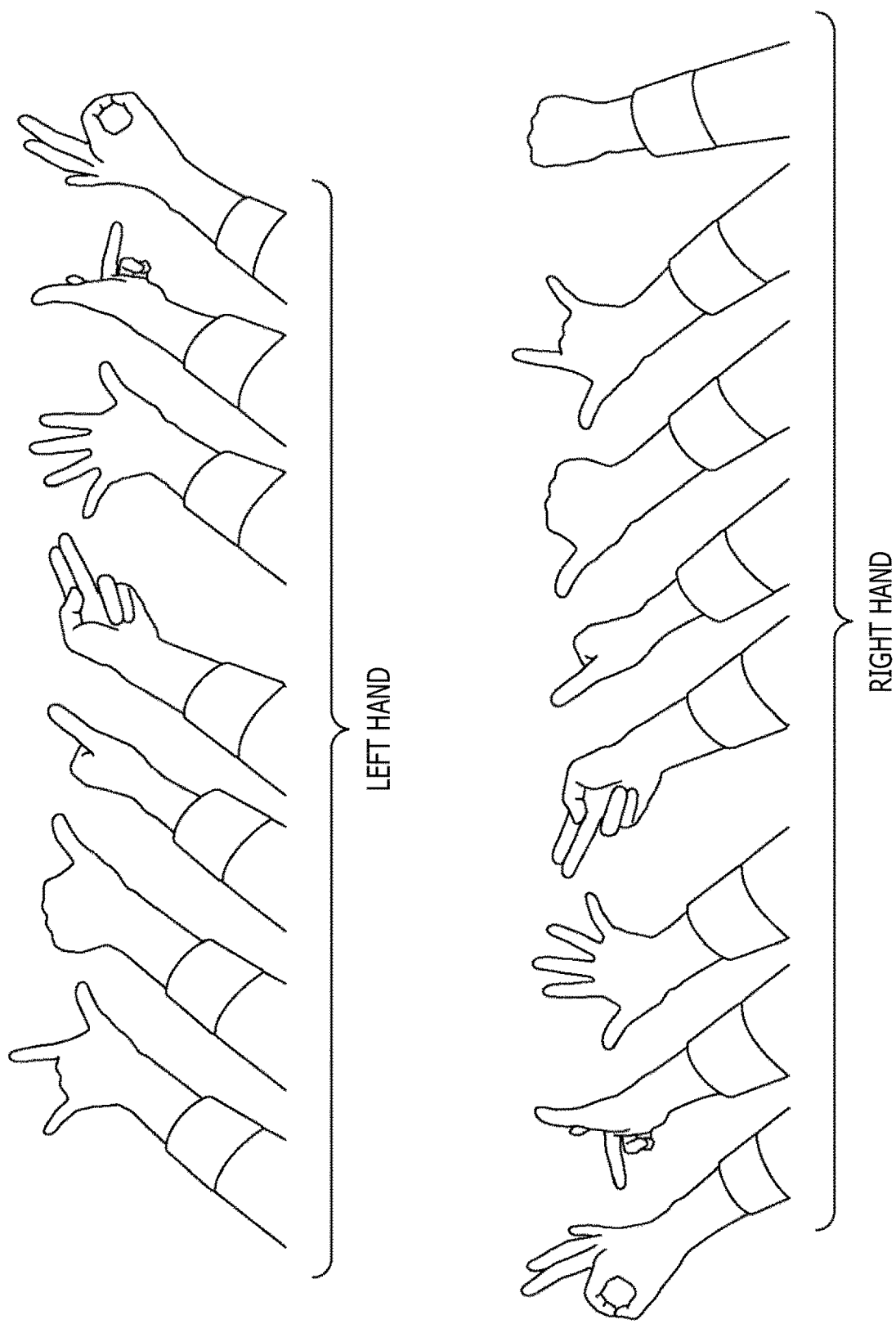
FIG. 2 is a view depicting as example of a shape of a hand recognized by a hand recognition process.

FIG. 2 is a view depicting an example of shapes of a hand recognized by the hand recognition process.

In the case where the user plays the application as the shooting game described hereinabove with reference to FIG. 1, depending upon whether the user is left-handed or right-handed user, a case in which the hand that holds the smartphone is the right hand and another case in which the hand that holds the smartphone is the left hand are available. In the case where the user holds the smartphone with the left hand, the hand that is photographed by the camera is the right hand, but in the case where the user holds the smartphone with the right hand, the hand photographed by the camera is the left hand. Accordingly, in order to be ready for a left-handed user and a right-handed used, it is necessary for the application to recognize both the left hand and the right hand.

In the case where one dictionary is used as a dictionary (for recognition) that is used in a hand recognition process, if it is tried to use the single dictionary to recognize various shapes of each of the left hand and the right hand, then since the number of variations of shapes of the hands is great as depicted in FIG. 2, it is difficult to achieve necessary accuracy as the recognition accuracy.

Further, in regard to the stone shape or a like shape, it is difficult to decide which one of the left and right hands the hand is, and if the decision between the left and right hands is mistaken, then the thumb and the little finger come to be handled conversely, and the shape of the hand cannot be recognized correctly.

Therefore, a method is available which performs left and right hand decision of deciding whether the hand photographed by a camera is the left hand or the right hand and performs, in the case where it is decided that the photographed hand is the left hand, a hand recognition process by using a dictionary for the left hand, but performs, in the case where it is decided that the photographed hand is the right hand, a hand recognition process by using a dictionary for the right hand.

As described above, in the case where left and right hand decision is to be performed, it is sufficient if only the shape of the left hand is covered with the dictionary for the left hand and it is sufficient if only the shape of the right hand is covered with the dictionary for the right hand. Therefore, it is possible to improve the recognition performance of the hand recognition process and decrease the period of time required for the hand recognition process.

Figure 3:
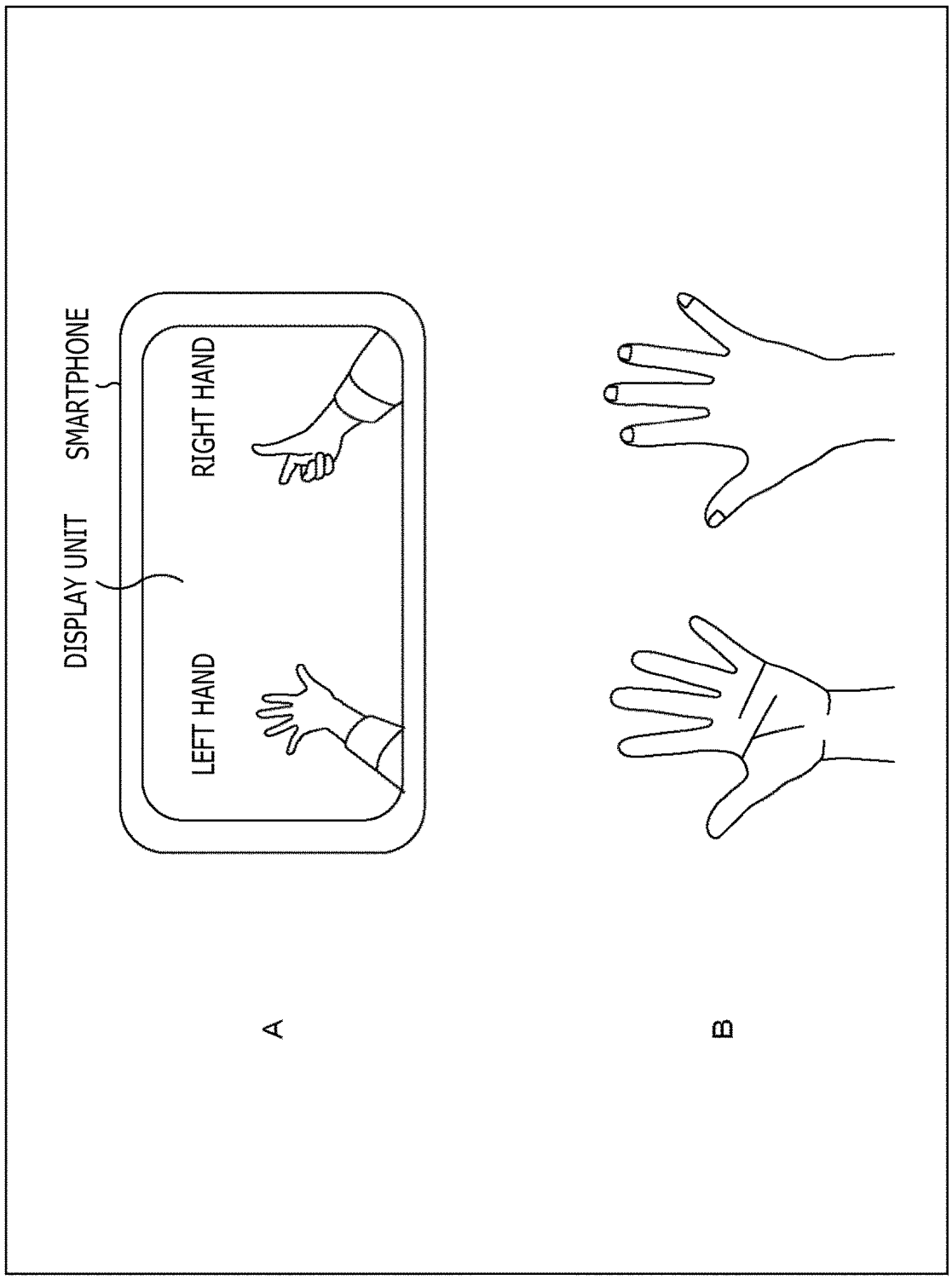
FIG. 3 depicts views illustrating an example of a decision method for left and right hand decision.

FIG. 3 depicts views illustrating an example of a decision method for left and right hand decision.

A of FIG. 3 depicts a first decision method for left and right hand decision.

In the case where the user holds the smartphone with one of the left hand and the right hand with the display unit of the smartphone directed toward the user side and photographs the other hand with the camera on the rear face side of the display unit, such an image that the left hand enters from the left side of the display screen of the display unit while the right hand enters from the right side of the display screen of the display unit.

Thus, in the case where a hand enters from the left side or the right side of the display screen of the display unit, it can be decided that the hand is the left hand or the right hand, respectively.

B of FIG. 3 depicts a second decision method for left and right hand decision.

In the case where the camera (image sensor) as an optical sensor is provided on the rear face side of the display unit of the smartphone and an image obtained by sensing of the camera as the optical sensor is, for example, an RGB image in which values of RGB (Red, Green and Blue) are pixel values, the back or front of the hand (palm or back of the hand) can be decided from the hand reflected in the RGB image depending upon the palmistry or the texture of the nails. Then, by specifying the position of the thumb of the hand reflected in the RGB image, which one of the left hand and the right hand the hand reflected in the RGB image is can be decided from a result of the decision between the back and the front of the hand and the position of the thumb.

On the other hand, in the case where a distance measurement sensor as an optical sensor is provided on the rear face side of the display unit of the smartphone and accordingly an image obtained by sensing of the distance measurement sensor as the optical sensor is a distance image in which distances are pixel values, the back and the front of the hand can be decided depending upon whether a central portion of the hand reflected in the distance image is recessed or projected. Alternatively, the rear and the front of the hand can be decided depending upon whether the fingers reflected in the distance image are curved to the front side or to the back side. Then, by specifying the position of the thumb of the hand reflected in the distance image, which one of the left hand and the right hand the hand reflected in the RGB image is from a result of the decision between the back and the front of the hand and the position of the thumb.

Figure 4:
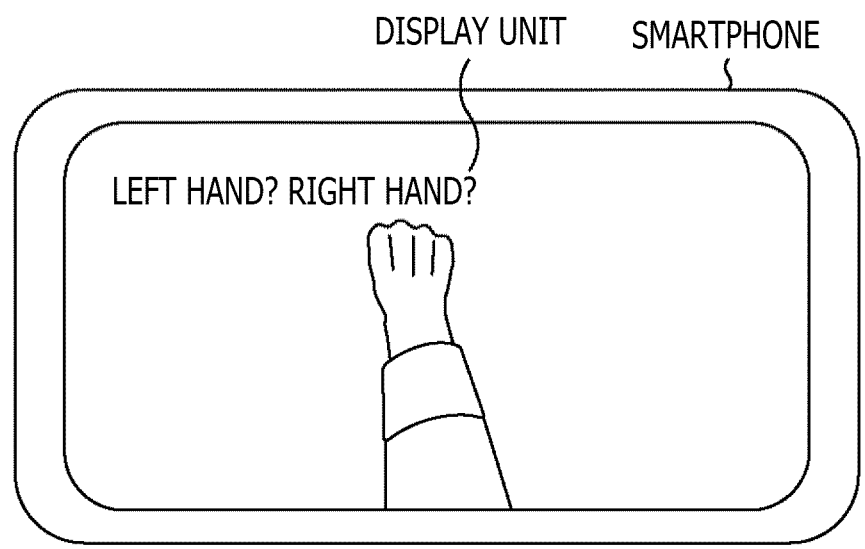
FIG. 4 is a view illustrating an example of a case in which first and second decision methods for left and right hand decision are fallible in left and right hand decision.

FIG. 4 is a view illustrating an example of a case in which the first and second decision methods for left and right hand decision are fallible in left and right hand decision.

The first and second decision methods for left and right hand decision are fallible in left and right hand decision is the case where a stone-shaped hand enters from the proximity of a middle portion of the display screen of the display unit of the smartphone as depicted in FIG. 4.

Further, since the first and second decision methods for left and right hand decision perform an image process for an image obtained by sensing of the optical sensor, they sometimes make wrong decision arising from that an image process is not performed appropriately by noise and so forth included is the image.

<Left and Right Hand Decision of Smartphone to which Present Technology is Applied>

In the following, left and right hand decision of the smartphone to which the present technology is applied is described. However, before this, a direction of the smartphone is defined.

Figure 5:
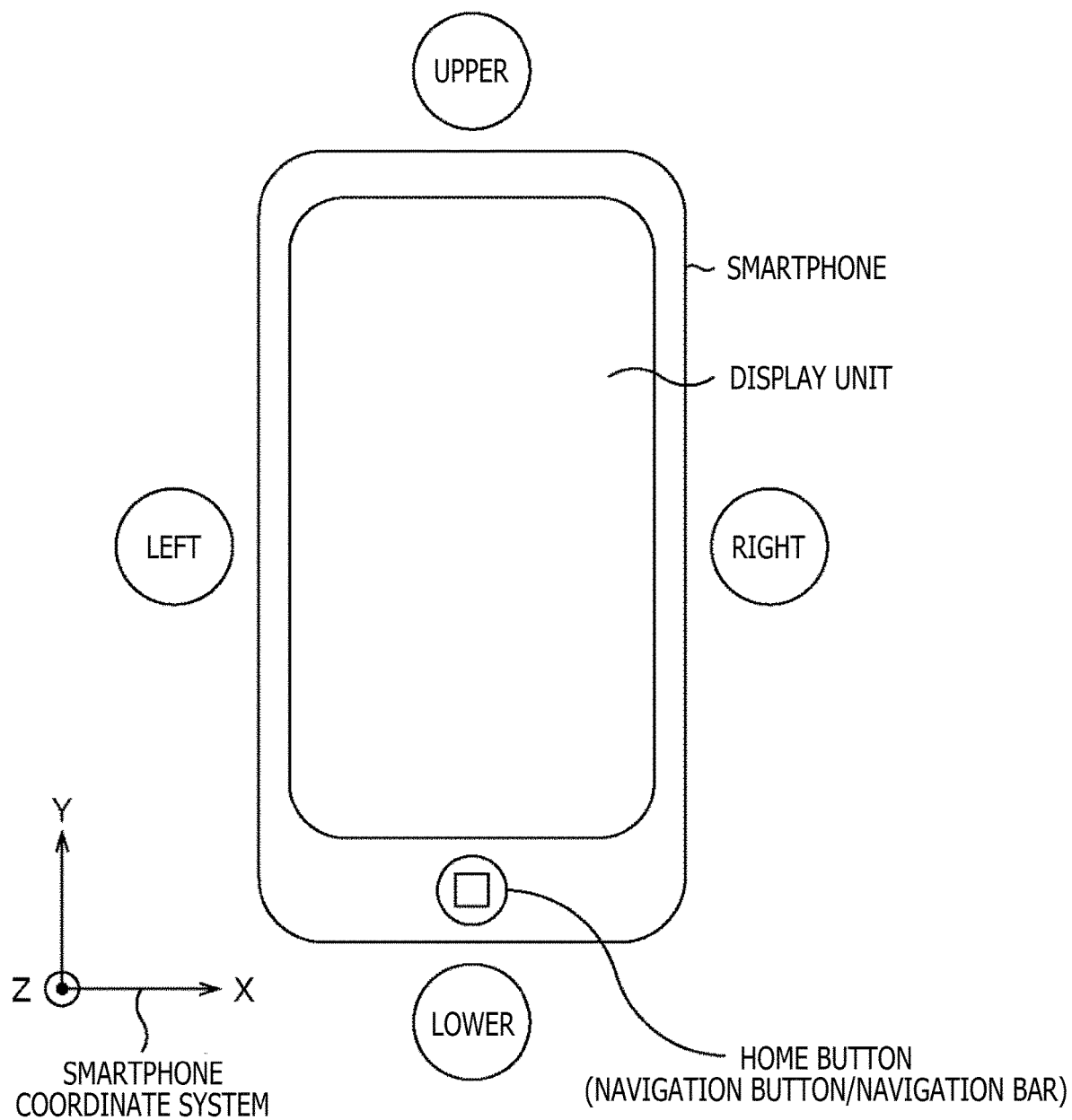
FIG. 5 is a view illustrating a definition of a direction of a smartphone to which the present technology is applied.

FIG. 5 is a view illustrating a definition of a direction of the smartphone to which the present technology is applied.

In the present technology, directions of the smartphone are defined similarly to those of an image displayed on the display unit is the case where what is generally called an automatic rotation function of the display unit of the smartphone is off. Accordingly, a portion at which a home button (or a navigation button or a navigation bar) of the smartphone is provided is a lower portion of the smartphone. Further, the upper side, left side, and right side of the smartphone in a posture in which a lower portion of the smartphone is directed to the lower side and the display unit is directed toward the user side (hereinafter referred to as default posture) are defined as an upper portion, a left portion, and a right portion of the smartphone, respectively.

Further, the rightward direction of the smartphone in the default posture is defined as an X axis, and the upward direction is defined as a Y axis while the forward direction (direction perpendicular to (the display screen of) the display unit) is defined as a Z axis. A local three-dimensional coordinate system regarding the smartphone is referred to as a smartphone coordinate system.

FIG. 6 depicts views illustrating left and right hand decision of a smartphone to which the present technology is applied.

As described hereinabove with reference to FIG. 1, in the case where a user holds the smartphone with one hand with the display unit of the smartphone directed toward the user side and the longitudinal direction of the smartphone directed horizontally, the user would hold a lower portion of the smartphone as depicted in FIG. 6.

A of FIG. 6 depicts a state in which the user holds the smartphone with the left hand. B of FIG. 6 depicts a state in which the user holds the smartphone with the right hand.

It is to be noted that, in the case where the user holds the smartphone with one hand, there is the possibility that the user may hold an upper portion.

However, at an upper portion on the rear face side of the display unit of the smartphone, a camera as an optical sensor (hereinafter referred to as rear face camera) and so forth are provided. Accordingly, in the case where the shooting game described hereinabove with reference to FIG. 1 is to be played, if the user holds an upper portion of the smartphone with one of the left and right hands, then the hand holding the upper portion of the smartphone disturbs photographing of the rear face camera.

From the foregoing, in the case where the user holds the smartphone with one hand with the display unit of the smartphone directed toward the user side and the longitudinal direction of the smartphone directed horizontally, the user inevitably holds a lower portion of the smartphone.

Here, the state of the smartphone in which the display unit of the smartphone is directed toward the user side and the longitudinal direction of the smartphone is directed horizontally is referred to also as portrait state.

In the case where the user holds the smartphone is the portrait state with one hand, the smartphone is postured such that a left portion or a right portion thereof is directed to the lower side.

In particular, is the case where the user holds the smartphone in the portrait state with the left hand, the smartphone is postured such that a right portion thereof is directed to the lower side as depicted in A of FIG. 6. On the other hand, in the case where the user holds the smartphone in the portrait state with the right hand, the smartphone is postured such that a left portion thereof is directed to the lower side as depicted in B of FIG. 6.

Further, in the case where the user holds the smartphone in the portrait state with the left hand, the hand photographed by the rear face camera is the right hand, and in the case where the user holds the smartphone in the portrait state with the right hand, the hand photographed by the rear face camera is the left hand.

Accordingly, left and right hand decision for deciding which one of the left and right hands the hand photographed by the rear face camera is can be performed according to the posture of the smartphone.

In particular, in the case where the smartphone is postured such that a right portion thereof is directed to the lower side, it can be decided that the hand photographed by the rear face camera is the right hand. On the other hand, in the case where the smartphone is postured such that a left portion thereof is directed to the lower side, it can be decided that the hand photographed by the rear face camera is the left hand.

In such left and right hand decision according to the posture of the smartphone as described above, since an image process is not performed, the left and right hand decision can be performed is a short period of time. Further, as long as the condition that the user holds a lower portion of the smartphone in the portrait state with one hand is satisfied, a mistake is not made in the left and right hand decision.

The posture of the smartphone can be detected, for example, by using the Gravitational acceleration.

Here, a smartphone generally has an acceleration sensor built therein and can detect (sense) the gravitational acceleration by the acceleration sensor.

As the posture of the smartphone, the direction of the smartphone with respect to the direction of the gravitational acceleration can be detected. In particular, as the posture of the smartphone, it can be detected whether the direction of the smartphone is a direction is which a right portion of the smartphone is directed toward the direction of the gravitational acceleration or a left portion of the smartphone is directed toward the direction of the gravitational acceleration.

In the case where the direction of the smartphone is a direction in which a right portion of the smartphone is directed in the direction of the gravitational acceleration, the smartphone is postured such that a right portion thereof is directed to the lower side as depicted in A of FIG. 6, and it can be decided that the hand photographed by the rear face camera is the right hand.

In the case where the direction of the smartphone is a direction in which a left portion of the smartphone is directed in the direction of the gravitational acceleration, the smartphone is postured such that a left portion thereof is directed to the lower side as depicted in B of FIG. 6, and it can be decided that the hand photographed by the rear face camera is the left hand.

In the smartphone of the present technology, left and right hand decision for deciding which one of the left and right hands the hand reflected in an image obtained by sensing of the optical sensor of the rear face camera or the like provided on the rear face side of the display unit of the smartphone (such an image is hereinafter referred to also as sensing image) is performed according to the posture of the smartphone. Then, according to a decision result of the left and right hand, decision, a hand recognition process for the left hand or a hand recognition process for the right hand is performed as a hand recognition process for recognizing the hand reflected in the sensing image. In particular, in the case where it is decided that the hand reflected in the sensing image is the left hand, the hand recognition process for the left hand is performed. On the other hand, in the case where it is decided in the left and right hand decision that the hand reflected in the sensing image is the right hand, the recognition process for the right hand is performed.

As described hereinabove, the left and right hand decision according to the posture of the smartphone can be performed in a short period of time. Further, as long as the condition that the user holds a lower portion of the smartphone in the portrait state with one hand is satisfied, a mistake is not made in the left and right hand decision.

Accordingly, according to the hand recognition process performed according to a decision result of such left and right hand decision as described above, the hand recognition process including the left and right hand decision can be performed in a short period of time and the recognition accuracy can be improved. As a result, an agreeable UI (User Interface) can be implemented.

It is to be noted that, although it is described here that left and right hand decision is performed according to the posture of the smartphone and the hand recognition process for the left hand or the hand recognition process for the right hand is performed according to a decision result of the left and right hand decision in order to facilitate understandings of the description, in terms of implementation, there is no necessity to expressly perform the left and right hand decision. In particular, in terms of implementation, it is sufficient if, in the case where the smartphone is postured such that a right portion thereof is directed to the lower side, since the hand to be reflected in the sensing image is the right hand, the hand recognition process for the right hand is performed, but in the case where the smartphone is postured such that a left portion thereof is directed to the lower side, since the hand to be reflected is the sensing image is the left hand, the hand recognition process for the left hand is performed.

As above, in the smartphone of the present technology, as the hand recognition process of recognizing a hand reflected in an image obtained by sensing of the optical sensor such as the rear face camera provided on the rear face side of the display unit of the smartphone, the hand recognition process for the left hand or the hand recognition process for the right hand can be performed according to the posture of the smartphone.

<Hand Recognition Process for Left Hand and Hand Recognition Process for Right Hand>

FIG. 7 is a view illustrating an example of the hand recognition process for the left hand and the hand recognition process for the right hand performed by the smartphone to which the present technology is applied.

In the smartphone to which the present technology is applied, a hand recognition process of a reversal method or a hand recognition process of a dictionary selection method can be performed according to the configuration of the optical sensor provided on the rear face side of the display unit of the smartphone.

In the hand recognition process of the reversal method, the hand recognition process for the left hand is a hand recognition process for one of a sensing image and a reversal image that is a left-right reversed image of the sensing image, and the hand recognition process for the right hand is a hand recognition process for the other of the sensing image and the reversal image.

In particular, in the hand recognition process of the reversal method, for example, a dictionary for the right hand that is a dictionary for one hand is used to perform a hand recognition process for a sensing image as the hand recognition process for the right hand. Further, a dictionary for one hand that is used in a hand recognition process for the right hand (here, a dictionary for the right hand) is used to perform a hand recognition process for a reversal image that is a left-right reversed image of the sensing image as the hand recognition process for the left hand.

It is to be noted that, in the hand recognition process of the reversal method, as the dictionary for one hand, the dictionary for the left hand can be used in place of the dictionary for the right hand. In the case where the dictionary for the left hand is used as the dictionary for one hand, as the hand recognition process for the right hand, a hand recognition process for a reversal image that is a left-right reversed image of the sensing image is performed using the dictionary for the left hand, and as the hand recognition process for the left hand, a hand recognition process for the sensing image is performed using the dictionary for the left hand.

In the hand recognition process of the dictionary selection method, the hand recognition process for the left hand is a hand recognition process in which a dictionary for the left hand is used, and the hand recognition process for the right hand is a hand recognition process in which a dictionary for the right hand is used.

As the configuration of the optical sensor provided on the rear face side of the display unit of the smartphone, a line symmetric configuration and a line asymmetric configuration are available.

The line symmetric configuration is such a configuration of an optical sensor that an imaging target image as a sensing image obtained by sensing a predetermined imaging target by the smartphone in a predetermined posture and an imaging target image as a sensing image obtained by sensing an imaging target line symmetric (with respect to the vertical direction) to the predetermined imaging target by the smartphone in a posture line symmetric to the predetermined posture (with respect to the vertical direction (direction of the gravitational acceleration)) are line symmetric to each other.

The line asymmetric configuration is such a configuration of an optical sensor that an imaging target image as a sensing image obtained by sensing a predetermined imaging target by the smartphone in a predetermined posture and an imaging target image as a sensing image obtained by sensing an imaging target line symmetric to the predetermined imaging target by the smartphone in a posture line symmetric to the predetermined posture are not line symmetric to each other.

Here, as the predetermined posture of the smartphone, for example, such a posture that a right portion or a left portion of the smartphone is directed to the lower side as depicted in FIG. 6 can be adopted. If, as the predetermined posture of the smartphone, for example, the posture in which a right portion of the smartphone is directed to the lower side is adopted, then the posture line symmetric to the predetermined posture is a posture in which a left portion of the smartphone is directed to the lower side.

Further, as the predetermined imaging target, for example, the left hand or the right hand can be adopted. In the case where, for example, the right hand is adopted as the predetermined imaging target, the imaging target line symmetric to the predetermined imaging target is the left hand.

In the smartphone to which the present technology is applied, in the case where the configuration of the optical sensor provided on the rear face side of the display unit of the smartphone is a line symmetric configuration, a hand recognition process of the reversal method can be performed. On the other hand, in the case where the configuration of the optical sensor is a line asymmetric configuration, a hand recognition process of the dictionary selection method can be performed.

Here, in regard to the hand recognition processes of the reversal method and the dictionary selection method, only one of the hand recognition processes of the reversal method and the dictionary selection method can be implemented according to the configuration of the optical sensor of the smartphone. Further, both of the hand recognition processes of the reversal method and the dictionary select-on method can be implemented in the smartphone such that one of the hand recognition processes of the reversal method and the dictionary selection method is selectively performed. It is to be noted that the smartphone can adopt a hand recognition process of a predetermined method such as the reversal method or the dictionary selection method irrespective of the configuration of the optical sensor.

FIG. 8 is a view illustrating an optical sensor of the line symmetric configuration.

In FIG. 8, a distance measurement sensor is adopted as the optical sensor provided on the rear face side of the display unit of the smartphone. The light measurement sensor includes a light emitting element and a light receiving element. The light emitting element emits light to apply the light on an imaging target, and the light receiving element receives the light reflected by the imaging target.

In FIG. 8, is the smartphone in the default posture, the light receiving element and the light emitting element are provided in the middle of an upper portion of the rear face side of the display unit so as to be lined up in the vertical direction.

In the case where the user holds a lower portion of the smartphone including the distance measurement sensor as the optical sensor configured in such a manner as described above and the right hand as the predetermined imaging target is sensed by the distance measurement sensor as the optical sensor of the smartphone in the posture in which a right portion of the smartphone is directed to the lower side (hereinafter referred to also as left-hand-held posture), since the light emitting element is positioned on the left side of the light receiving element, in a sensing image obtained by sensing (here, a distance image), a shadow (occlusion) possibly appears on the right side of the right hand as the predetermined imaging target.

On the other hand, in the case where the user holds a lower portion of the smartphone in a posture line symmetric to the posture described above and the left hand as an imaging target line symmetric (with respect to the vertical direction (line)) to the right hand as the predetermined imaging target (the line symmetric imaging target is hereinafter referred to as line symmetric imaging target) is sensed by the distance measurement sensor as the optical sensor of the smartphone in the posture in which a left portion of the smartphone is directed to the lower side (hereinafter referred to also as right-hand-held posture), since the light emitting element is positioned on the right side of the light receiving element, in a sensing image obtained by sensing, a shadow possibly appears on the left side of the left hand as the line symmetric imaging target.

Accordingly, a sensing image obtained in the case where the right hand as the predetermined imaging target is sensed by the smartphone in the left-hand-held posture and a sensing image obtained in the case where the left hand as the line symmetric imaging target is sensed by the smartphone in the right-hand-held posture are line symmetric to each other including the shadows.

The configuration of the optical sensor by which a sensing image obtained in the case where the right hand as the predetermined imaging target is sensed by the smartphone in the left-hand-held posture and a sensing image obtained in the case where the left hand as the line symmetric imaging target is sensed by the smartphone in the right-hand-held posture are line symmetric to each other including shadows as described in such a manner as described is the line symmetric configuration.

According to the optical sensor of the line symmetric configuration, since a sensing image obtained in the case where the right hand as the predetermined imaging target is sensed by the smartphone in the left-hand-held posture and a sensing image obtained in the case where the left hand as the line symmetric imaging target is sensed by the smartphone in the right-hand-held posture are line symmetric to each other including shadows, the hand recognition process of the reversal method can be adopted.

In particular, for example, by performing a hand recognition process for a sensing image by using a dictionary for the right hand as the hand recognition process for the right hand and performing a hand recognition process for a reversal image, which is a left-right reversed image of the sensing image, by using a dictionary for the right hand used in the hand recognition process for the right hand as the hand recognition process for the left hand, hand recognition can be performed with high accuracy using only a dictionary for one hand (here, the dictionary for the right hand).

It is to be noted that, as the optical sensor of the line symmetric configuration, not only a distance measurement sensor in which the light receiving element and the light emitting element are provided so as to be lined up in the vertical direction in the middle of an upper portion of the rear face side of the display unit of the smartphone in the default posture as described above but also, for example, a monaural RGB camera of a monaural type (monocular type) for photographing an RGB image in which RGB values are pixel values are available.

FIG. 9 is a view illustrating an optical sensor of the line asymmetric configuration.

In FIG. 9, as the optical sensor provided on the rear face side of the display unit of the smartphone, a distance measurement sensor having a light emitting element and a light receiving element is adopted similarly as that in FIG. 9.

However, in FIG. 9, in the smartphone in the default posture, the light receiving element is provided in the middle of an upper portion of the rear face side of the display unit and the light emitting element is provided on the right side of the light receiving element.

In the case where the user holds the smartphone, which includes the distance measurement sensor as the optical sensor configured in such a manner as described above, in the left-hand-held posture and the right hand as the predetermined imaging target is sensed by the distance measurement sensor as the optical sensor of the smartphone, since the light emitting element is positioned on the lower side of the light receiving element, in a sensing image (distance image) obtained by sensing, a shadow possibly appears on the upper side of the right hand as the predetermined imaging target.

On the other hand, in the case where the user holds the smartphone in a posture line symmetric to the posture described above, that is, in the right-hand-held posture, and the left hand as a line symmetric imaging target is sensed by the distance measurement sensor as the optical sensor of the smartphone, since the light emitting element is positioned on the upper side of the light receiving element, in a sensing image obtained by sensing, a shadow possibly appears on the lower side of the left hand as the line symmetric imaging target.

In particular, in a sensing image obtained in the case where the right hand as the predetermined imaging target is sensed by the smartphone in the left-hand-held posture and a sensing image obtained the case where the left hand as the line symmetric imaging target is sensed by the smartphone in the right-hand-held posture, shadows are not line symmetric to each other. Accordingly, a sensing image obtained in the case where the right hand as the predetermined imaging target is sensed by the smartphone in the left-hand-held posture and a sensing image obtained in the case where the left hand as the line symmetric imaging target is sensed by the smartphone in the right-hand-held posture are not line symmetric but are line asymmetric to each other.

The configuration of the optical sensor in which a sensing image obtained in the case where the right hand as the predetermined imaging target is sensed by the smartphone in the left-hand-held posture and a sensing image obtained in the case where the left hand as the line symmetric imaging target is sensed by the smartphone in the right-hand-held posture are line asymmetric to each other including shadows in such a manner as described above is the line asymmetric configuration.

According to the optical sensor of the line asymmetric configuration, since a sensing image obtained in the case where the right hand as the predetermined imaging target is sensed by the smartphone in the left-hand-held posture and a sensing image obtained in the case where the left hand as the line symmetric imaging target is sensed by the smartphone in the right-hand-held posture are line asymmetric to each other including shadows, the hand recognition process of the dictionary selection method can be adopted.

In particular, for example, by performing a hand recognition process for a sensing image by using the dictionary for the right hand as the hand recognition process for the sight hand and performing a hand recognition process for a sensing image by using the dictionary for the left hand as the hand recognition process for the left hand, hand recognition can be performed with high accuracy.

It is to be noted that, as the optical sensor of the line asymmetric configuration, a TOE (Time Of Flight) sensor as a distance measurement sensor in which a light receiving element and a light emitting element are not provided so as to be lined up is the vertical direction in the middle of an upper portion of the rear face side of the display unit of the smartphone in the default posture, a structured light camera, a stereo camera of a (patterned) stereo type and so forth are available.

<Example of Hardware Configuration of Embodiment of Smartphone to which Present Technology is Applied>

Figure 10:
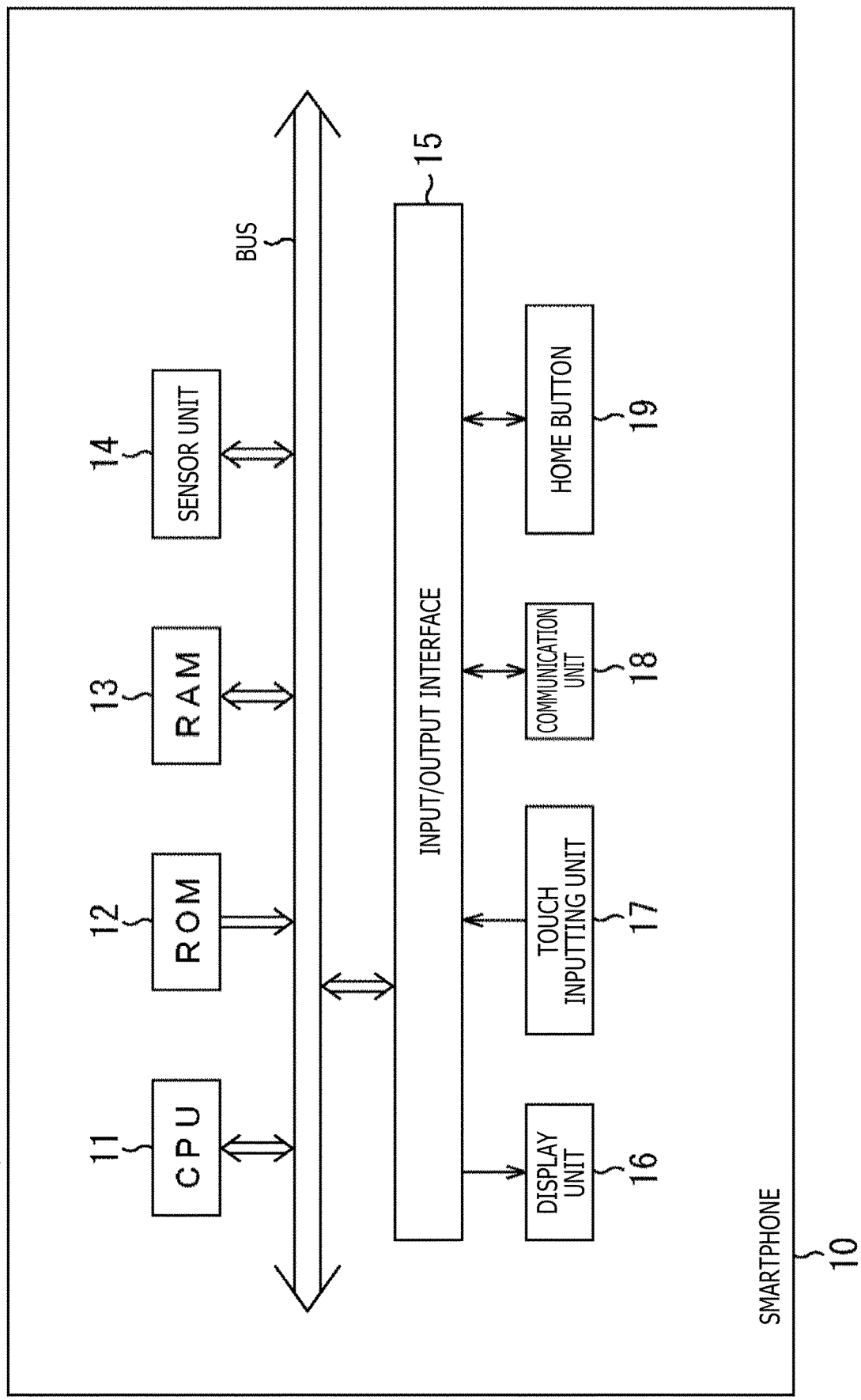
FIG. 10 is a block diagram depicting an example of a hardware configuration of an embodiment of a smartphone to which the present technology is applied.

FIG. 10 is a block diagram depicting an example of a hardware configuration of an embodiment of a smartphone to which the present technology is applied.

In FIG. 1, the smartphone 10 includes a CPU (Central Processing Unit) 11, a ROW (Read Only Memory) 12, a RkM (Random Access Memory) 13, a sensor unit 14, an input/output interface 15, a display unit 16, a touch inputting unit 17, a communication unit 18, a home button 19 and so forth.

The blocks from the CPU 11 to the input/output interface 15 are connected to each other through a bus. The blocks from the display unit 16 to the home button 19 are connected to the input/output interface 15.

The CPU 11 executes a program stored in the ROM 12 or the RAM 13 to perform various processes. The RUM 12 and the RAM 13 store programs to be executed by the CPU 11, data necessary for operation of the CPU 11 and so forth.

The sensor unit 14 includes acceleration sensors, various optical sensors and other necessary sensors and senses predetermined physical amounts. As such optical sensors, for example, a monaural RGB camera that photographs an RGB image, a monaural gray camera that photographs a white-and-black (gray scale) image, a distance measurement sensor that obtains a distance image in which a pixel value is a distance and so forth are available. As the distance measurement sensor, a TOP sensor, a structured light camera, a (patterned) stereo camera and so forth are available. The optical sensor can be provided on the display unit 16 side or the rear face side of the display unit 16. It is to be noted here that the optical sensor is provided at least on the rear face side of the display unit 16, and a hand recognition process is performed using a sensing image obtained by sensing of the optical sensor provided on the rear face side of the display unit 16.

The input/output interface 15 functions as an interface to the blocks from the display unit 16 to the home button 19 and other devices.

The display unit 16 displays an image. The touch inputting unit 17 accepts a touch operation (a tap, a flip or the like) of a user. The display unit 16 and the touch inputting unit 17 can be configured integrally from a touch panel or the like.

The communication unit 18 performs communication of a predetermined communication method of a wireless LAN (Local Area Network) or the like.

The home button 19 is a physical or virtual button provided at a lower portion of the smartphone 10.

In the smartphone 10 configured in such a manner as described above, the CPU 11 (computer) executes a program installed in advance in the ROM 12 or the RAM 13 or a program downloaded by the communication unit 18 and installed into the ROM 12 or the RAM 13 to perform various processes. Consequently, the smartphone functions, for example, as a recognition apparatus that performs hand recognition, a game machine of the shooting game described hereinabove with reference to FIG. 1 or the like.

In particular, in the case where the smartphone 10 has installed therein the program for performing hand recognition and the program for performing the shooting game, the smartphone 10 comes to substantially have a functional configuration hereinafter described and functions as a recognition apparatus that performs hand recognition and a game machine of the shooting game.

It is to be noted that processes to be performed in accordance with a program by the CPU 11 as a computer need not be performed in a time series in accordance with an order described as a flow chart hereinafter described. In particular, the processes performed in accordance with a program by the computer includes processes that are executed is parallel or individually (for example, parallel processing or processes by an object).

Further, the program may be processed by a single computer (processor) or may be processed by distributed processing by a plurality of computers. Further, the program may be transferred to and executed by a remote computer.

<Detection of Posture of Smartphone 10>

Figure 11:
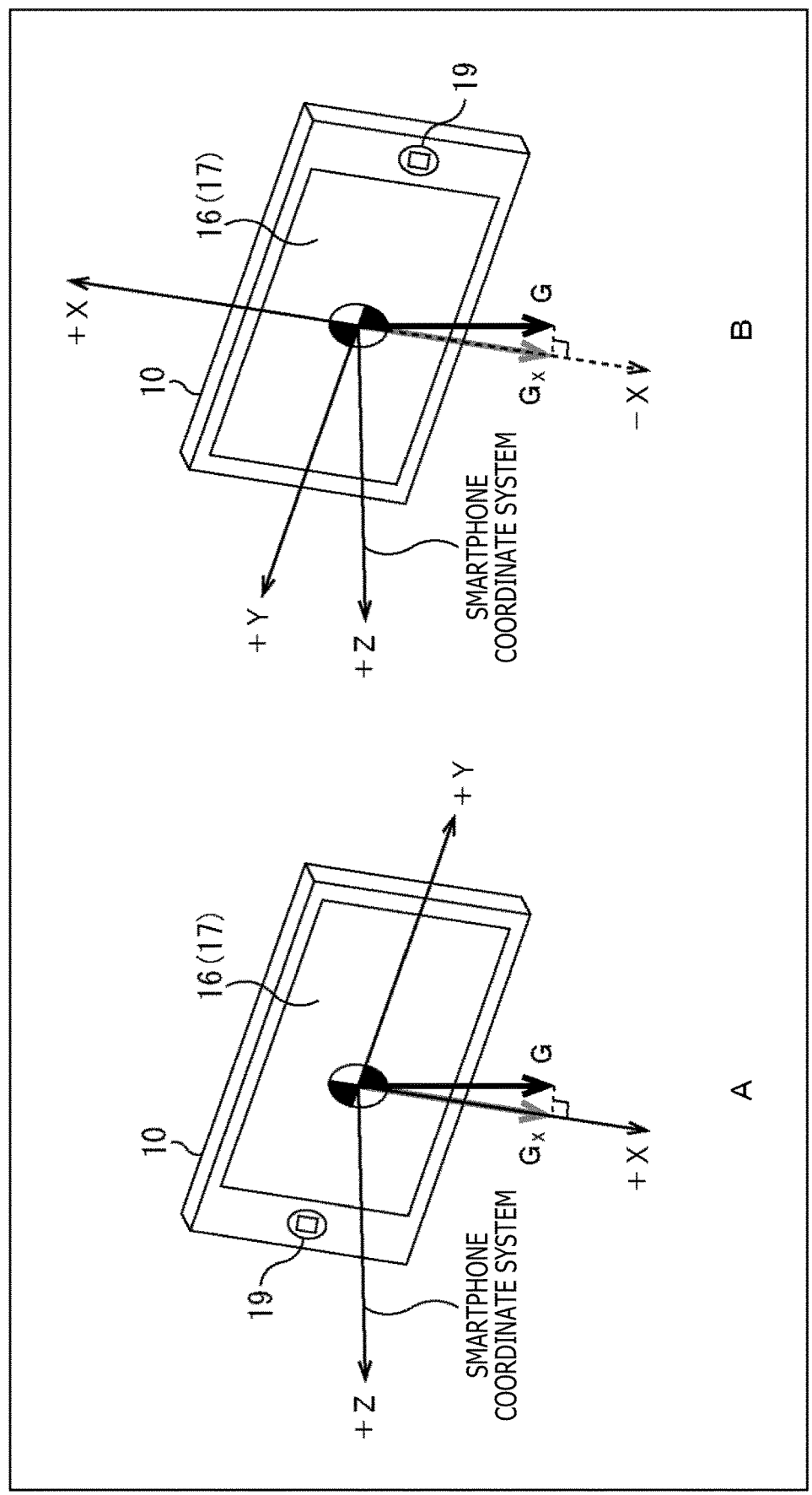
FIG. 11 depicts views illustrating an example of a detection method for detection of a posture of a smartphone 10.

FIG. 11 depicts views illustrating an example of a detection method for detection of the posture of the smartphone 10.

The smartphone 10 can detect a direction of the smartphone with respect to the direction of the gravitational acceleration as the posture of the smartphone 10. For example, by the smartphone 10, the posture of the smartphone in which the direction of the smartphone 10 is a direction in which a right portion thereof is directed in the direction of the gravitational acceleration is detected as the left-hand-held posture. On the other hand, the posture of the smartphone in which the direction of the smartphone 10 is a direction in which a left portion thereof is directed to the direction of the gravitational acceleration is detected as the right-hand-held posture.

In the smartphone 10, a unit vector G in the direction of the gravitational acceleration (hereinafter referred to also as gravitational acceleration direction vector) is obtained from a result of sensing of the acceleration sensor. Then, the left-hand-held posture and the right-hand-held posture can be detected according to an X component Gx of the smartphone coordinate system (component in the X-axis direction) of the gravitational acceleration direction vector G.

A of FIG. 11 is a view illustrating detection of the left-hand-held posture.

For example, in the case where the + direction of the X axis of the smartphone coordinate system is within a range of ±45 degrees around the Y axis and besides within a range of ±45 degree around the Z axis with reference to the direction of the gravitational acceleration, the posture of the smartphone can be deemed as the left-hand-held posture.

In this case, in the case where the X component Gx of the gravitational acceleration direction vector G satisfies an expression $1/(\sqrt{2}) < Ga$, the posture of the smartphone can be detected as the left-hand-held posture.

B of FIG. 11 is a view illustrating detection of the right-hand-held posture.

For example, in the case where the − direction of the X axis of the smartphone coordinate system is within a range of ±45 degrees around the Y axis and besides within a range of ±45 degree around the Z axis with reference to the direction of the gravitational acceleration, the posture of the smartphone can be deemed as the right-hand-held posture.

In this case, is the case where the X component Ga of the gravitational acceleration direction vector G satisfies an expression $Ga < -1/(°2)$, the posture of the smartphone can be detected as the right-hand-held posture.

First Example of Functional Configuration of Smartphone 10

Figure 12:
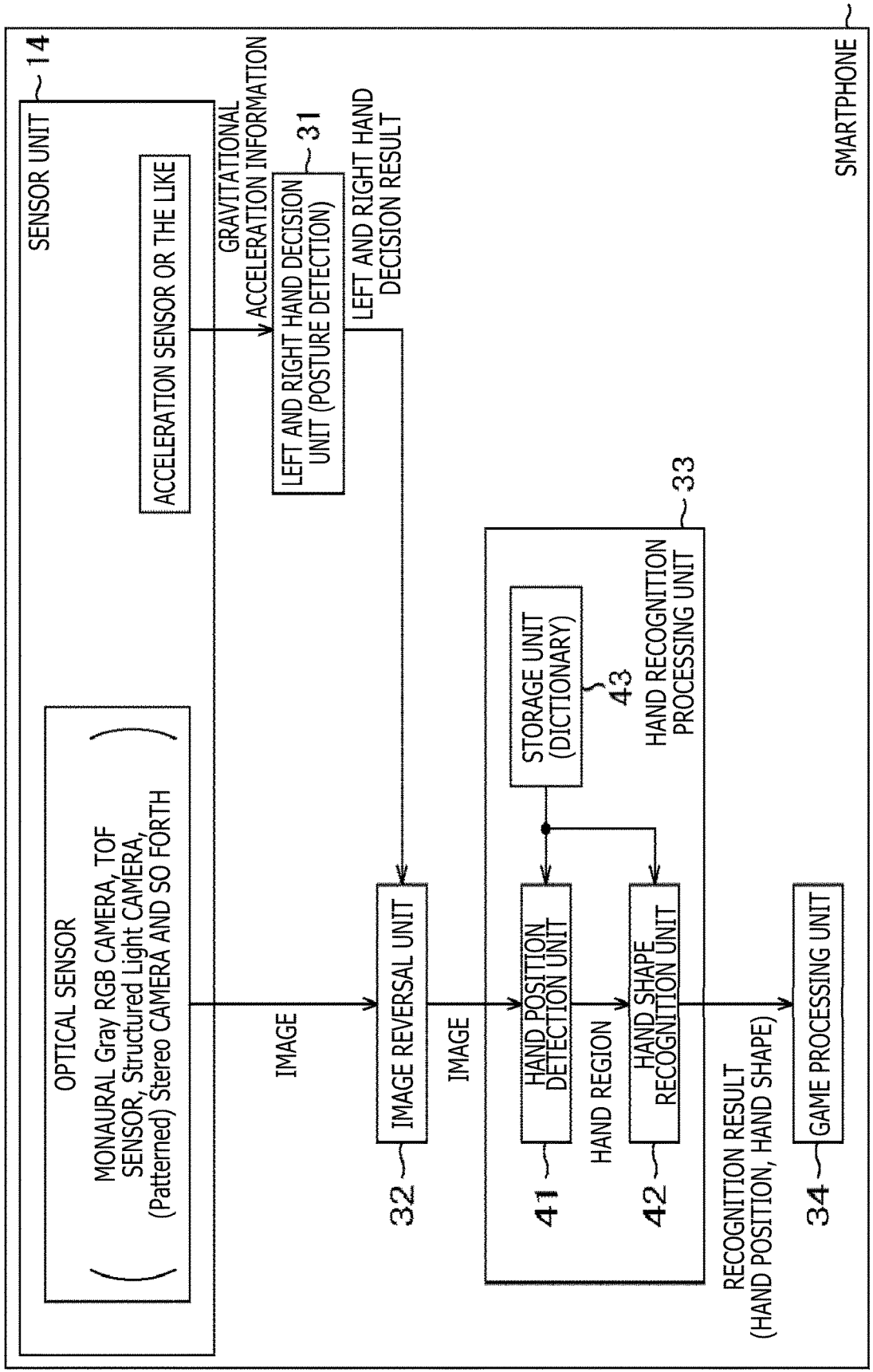
FIG. 12 is a block diagram depicting a first example of a functional configuration of the smartphone 10.

FIG. 12 is a block diagram depicting a first example of a functional configuration of the smartphone 10.

In the smartphone 10 of FIG. 12, the configuration of the optical sensor the sensor unit 14 has is a line symmetric configuration, and therefore, the hand recognition process of the reversal method described hereinabove with reference to FIG. 7.

In particular, in FIG. 12, the smartphone 10 includes a sensor unit 14, a left and right hand decision unit 31, an image reversal unit. 32, a hand recognition processing unit 33, and a game processing unit 34.

To the left and right hand decision unit 31, gravitational acceleration information representative of the direction of the gravitational acceleration is supplied as a result of sensing of the acceleration sensor of the sensor unit 14 from the acceleration sensor.

The left and right hand decision unit 31 performs detection of the posture of the smartphone 10 by using the gravitational acceleration information from the acceleration sensor of the sensor unit 14. By the detection of the posture of the smartphone 10, the left and right hand decision unit 31 substantially performs left and right hand decision of deciding which one of the left and right hands the hand reflected in a sensing image obtained by sensing of the optical sensor of the sensor unit 14 is.

In particular, the left and right hand decision unit 31 uses the gravitational acceleration information to detect that the posture of the smartphone 10 is the left-hand-held posture or the right-hand-held posture (and further is some other posture) as described hereinabove with reference to FIG. 11.

In the case where it is detected that the posture of the smartphone 10 is the left—hand—held posture, in the left and right hand decision, it can be decided that the hand reflected in the sensing image is the right hand. In the case where it is detected that the posture of the smartphone 10 is the right-hand-held posture, in the left and right hand decision, it can be decided that the hand reflected in the sensing image is the left hand.

The left and right hand decision unit 31 supplies a left and right hand decision result that is a result of the left and right hand decision (this can be regarded also as a result of detection of the posture of the smartphone 10) to the image reversal unit 32.

To the image reversal unit 32, not only the left and right hand decision result is supplied from the left and right hand decision unit 31, but also a sensing image obtained by sensing of the optical sensor of the sensor unit 14 is supplied from the optical sensor.

The image reversal unit 32 either leaves the sensing image from the sensor unit 14 as it is or left and right reverses the sensing image according to the left and right hand decision result from the left and right hand decision unit 31 and sets the resulting image as a target image to be made a target of the hand recognition process, and supplies the target image to the hand recognition processing unit 33.

The hand recognition processing unit 33 performs a hand recognition process for the target image supplied from the image reversal unit 32 as a target.

The hand recognition processing unit 33 includes a hand position detection unit 41, a hand shape recognition unit 42, and a storage unit 43.

The hand position detection unit. 41 uses a dictionary stored in the storage unit 43 and determines the target image from the image reversal unit 32 as a target to detect a hand region in which a hand is reflected from within the target image. Further, the hand position detection unit 41 detects the position of the hand region as a hand position that is the position of the hand and supplies the hand position to the hand shape recognition unit 42 together with the image of the hand region.

The hand shape recognition unit 42 uses the dictionary stored in the storage unit 43 to recognize a hand shape that is a shape of the hand from the image of the hand region from the hand position detection unit 41 and supplies the hand shape as a recognition result of the hand recognition process to the game processing unit 34 together with the hand position.

The storage unit 43 has stored therein a dictionary of (a standard pattern and so forth of) a hand as a dictionary to be used in the hand position detection unit 41 and the hand shape recognition unit 42.

It is to be noted that the storage unit 43 has stored therein only one of the dictionary for the left hand and the dictionary for the right hand.

In the case where the storage unit 43 has only the dictionary for the left hand stored therein, when the left and right hand decision result represents that the hand reflected in the sensing image is the left hand, the image reversal unit 32 sets the sensing image as it is as the target image. On the other hand, when the left and right hand decision result represents that the hand reflected in the sensing image is the right hand, the image reversal unit 32 left and right reverses the sensing image and sets a reversal image obtained by the left and right reversal as a target image.

On the other hand, in the case where the storage unit 43 has only the dictionary for the right hand stored therein, when the left and right hand decision result represents that the hand reflected is the sensing image is the right hand, the image reversal unit 32 sets the sensing image as it is as the target image. On the other hand, when the left and right hand decision result represents that the hand reflected in the sensing image is the left hand, the image reversal unit 32 left and right reverses the sensing image and sets a reversal image obtained by the left and right reversal as a target image.

Note that it is assumed here that the storage unit 43 has stored therein only the dictionary for the right hand from between the dictionary for the left hand and the dictionary for the right hand. Accordingly, in the case where the left and right hand decision result represents that the hand reflected in the sensing image is the right hand, the image reversal unit 32 sets the sensing image as it is as a target image. On the other hand, in the case where the left and right hand decision result represents that the hand reflected in the sensing image is the left hand, the image reversal unit 32 left and right reverses the sensing image and sets a reversal image obtained by the left and right reversal as a target image.

The game processing unit 34 is a block that causes the smartphone 10 to function, for example, as the shooting game described hereinabove with reference to FIG. 1 and performs such a process as to (display such a CG as to) emit a beam from the tip of the forefinger of the hand of the user displayed on the display unit 16, for example, according to a recognition result from (the hand shape recognition unit 42 of) the hand recognition processing unit 33.

Figure 13:
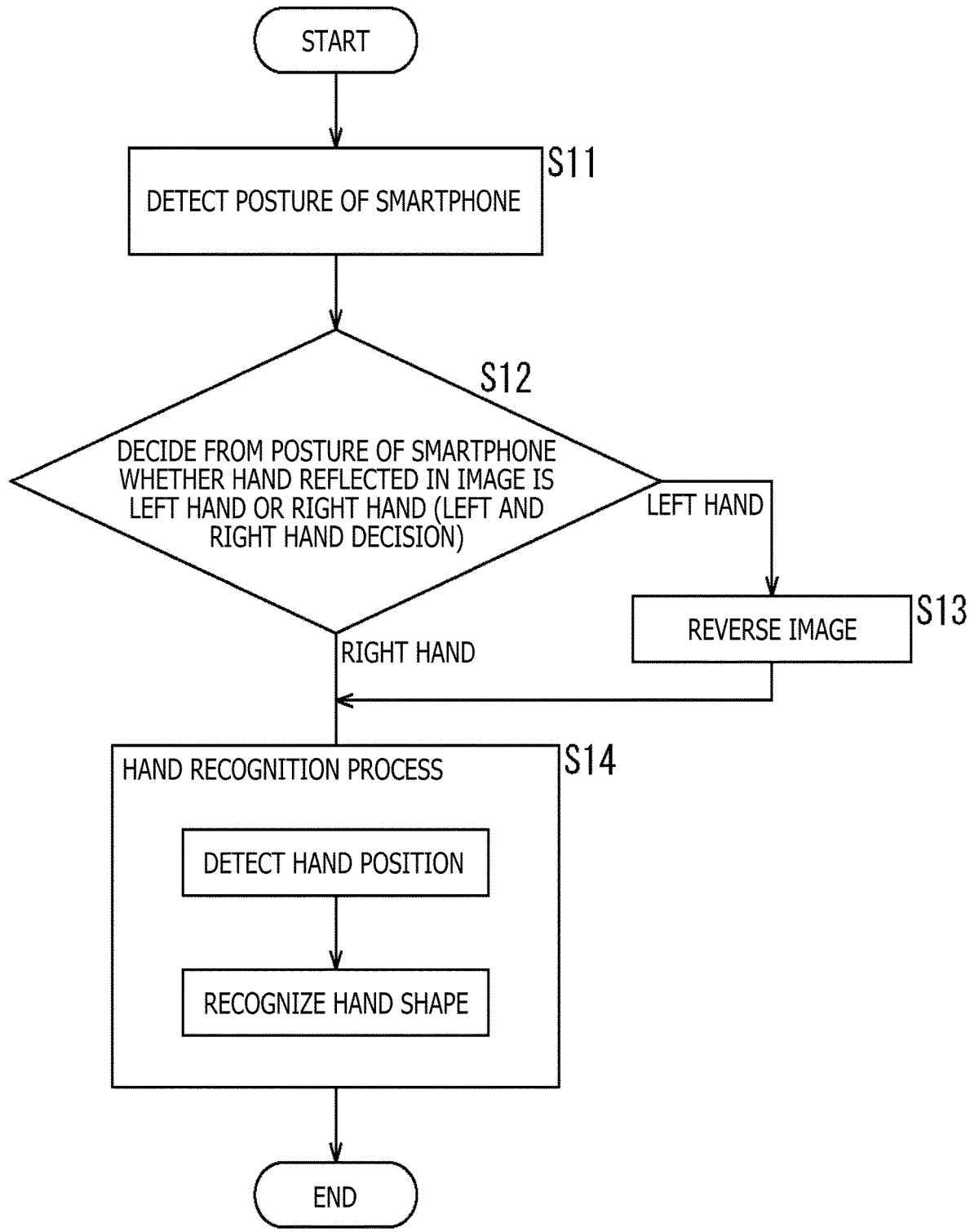
FIG. 13 is a flow chart illustrating an example of processing of the first example of a functional configuration of the smartphone 10.

FIG. 13 is a flow chart illustrating an example of processing of the smartphone 10 of FIG. 12.

In step S11, the left and right hand decision unit 31 uses gravitational acceleration information from the acceleration sensor of the sensor unit 14 to perform detection of the posture of the smartphone 10, and the processing advances to step S12.

In step S12, the left and right hand decision unit 31 performs left and right hand decision of deciding, from a detection result of the posture of the smartphone 10, which one of the left and right hands the hand reflected in a sensing image obtained by sensing of the optical sensor of the sensor unit 14 is.

In the case where it is decided by the left and right hand decision in step S12 that the hand reflected in the sensing image is the left hand, the left and right hand decision unit 31 supplies a reflect and right hand decision result representing this to the image reversal unit 32. Then, the processing advances to step S13.

In step S13, the image reversal unit 32 to which the left and right hand decision result that the hand reflected in the sensing image is the left hand is supplied from the left and right hand decision unit 31 left and right reverses the sensing image supplied from the optical sensor of the sensor unit 14 and sets a reversal image obtained by the left and right reversal as a target image. Then, the image reversal unit 32 supplies the target image to the hand recognition processing unit 33, and the processing advances from step S13 to step S14.

In step S14, the hand recognition processing unit 33 performs a hand recognition process for the target image supplied from the image reversal unit 32, and the processing ends therewith.

In particular, in the hand recognition processing unit 33, the hand position detection unit 41 uses the dictionary for the right hand stored in the storage unit 43 and determines the reversal image that is the target image from the image reversal unit 32 as a target and detects an image of a hand region in which the hand is reflected and a hand position from the target image and supplies them to the hand shape recognition unit 42.

The hand shape recognition unit 42 uses the dictionary stored in the storage unit 43 to recognize a hand shape from the image of the hand region from the hand position detection unit 41 and supplies the hand shape as a recognition result of the hand recognition process to the game processing unit 34 together with the hand position.

On the other hand, in the case where it is decided in the left and right hand decision in step S12 that the hand reflected in the sensing image is the right hand, the left and right hand decision unit 31 supplies a left and right hand decision result representing this to the image reversal unit 32.

The image reversal unit 32 to which the left and right hand decision result that the hand reflected in the sensing image is the right hand is supplied from the left and right hand decision unit 31 sets the sensing image itself supplied from the optical sensor of the sensor unit 14 as a target image. Then, the image reversal unit 32 supplies the target image to the hand recognition processing unit 33, and the processing advances from step S12 to step S14.

In step S14, the hand recognition processing unit 33 determines the target image supplied from the image reversal unit 32 as a target and performs a hand recognition process for the target image, and the processing ends therewith.

It is to be noted that, since, in the present case, the target image is the sensing image itself, the hand recognition processing unit 33 uses the dictionary for the right hand stored in the storage unit 43 and performs a hand recognition process for the sensing image itself that is the target image from the image reversal unit 32.

Second Example of Functional Configuration of Smartphone 10

Figure 14:
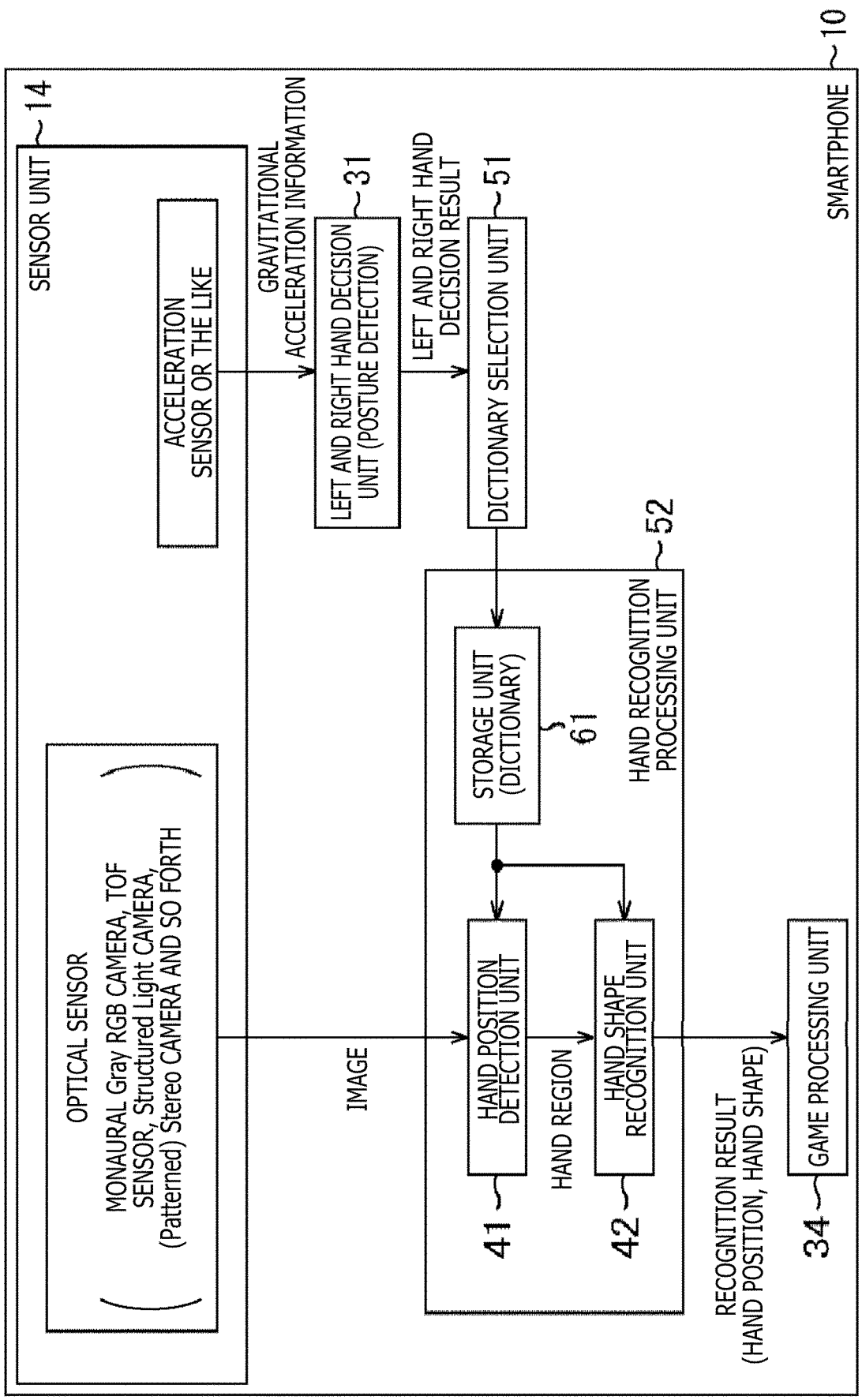
FIG. 14 is a block diagram depicting a second example of a functional configuration of the smartphone 10.

FIG. 14 is a block diagram depicting a second example of a functional configuration of the smartphone 10.

It is to be noted that, in FIG. 14, portions corresponding to those of the case of FIG. 12 are denoted by the same reference signs, and description of them is omitted suitably.

In the smartphone 10 of FIG. 14, the configuration of the optical sensor the sensor unit 14 has is a line asymmetric configuration, and therefore, a hand recognition process of the dictionary selection method described hereinabove with reference to FIG. 7 is implemented.

In particular, in FIG. 14, the smartphone 10 includes a sensor unit 14, a left and right hand decision unit 31, a game processing unit 34, a dictionary selection unit 51, and a hand recognition processing unit 52.

Accordingly, the smartphone 10 of FIG. 14 is the same as that of the case of FIG. 12 in that it includes the sensor unit 14, the left and right hand decision unit 31, and the game processing unit 34. However, the smartphone 10 of FIG. 14 is different from that of the case of FIG. 12 in that the image reversal unit 32 is not provided, that the dictionary selection unit 51 is Provided newly, and that the hand recognition processing unit 52 is provided in place of the hand recognition processing unit 33.

To the dictionary selection unit 51, a left and right hand decision result is supplied from the left and right hand decision unit 31. The dictionary selection unit 51 selects one of the dictionary for the left hand the dictionary for the right hand stored in a storage unit 61 as a dictionary for recognition to be used in a hand recognition process according to the left and right hand decision result from the left and right hand decision unit 31.

The hand recognition processing unit 52 determines a sensing image itself supplied from the optical sensor of the sensor unit 14 as a target image and performs a hand recognition process for the target image.

The hand recognition processing unit 52 includes a hand position detection unit 41, a hand shape recognition unit 42, and a storage unit 61.

Accordingly, the hand recognition processing unit 52 is the same as the hand recognition processing unit 33 of FIG. 12 in that it includes the hand position detection unit 41 and the hand shape recognition unit 42. However, the hand recognition processing unit 52 is different from the hand recognition processing unit 33 in that the storage unit 61 is provided in place of the storage unit 43.

The storage unit 61 has stored therein both the dictionary for the left image and the dictionary for the right hand as dictionaries for hands to be used in the hand position detection unit 41 and the hand shape recognition unit 42. The storage unit 61 supplies a dictionary selected as the dictionary for recognition by the dictionary selection unit 51 from between the dictionary for the left hand and the dictionary for the right hand to the hand position detection unit 41 and the hand shape recognition unit 42. Accordingly, the hand position detection unit 41 and the hand shape recognition unit 42 perform processing by using the dictionary selected as a dictionary for recognition by the dictionary selection unit 51 from between the dictionary for the left hand and the dictionary for the right hand.

Figure 15:
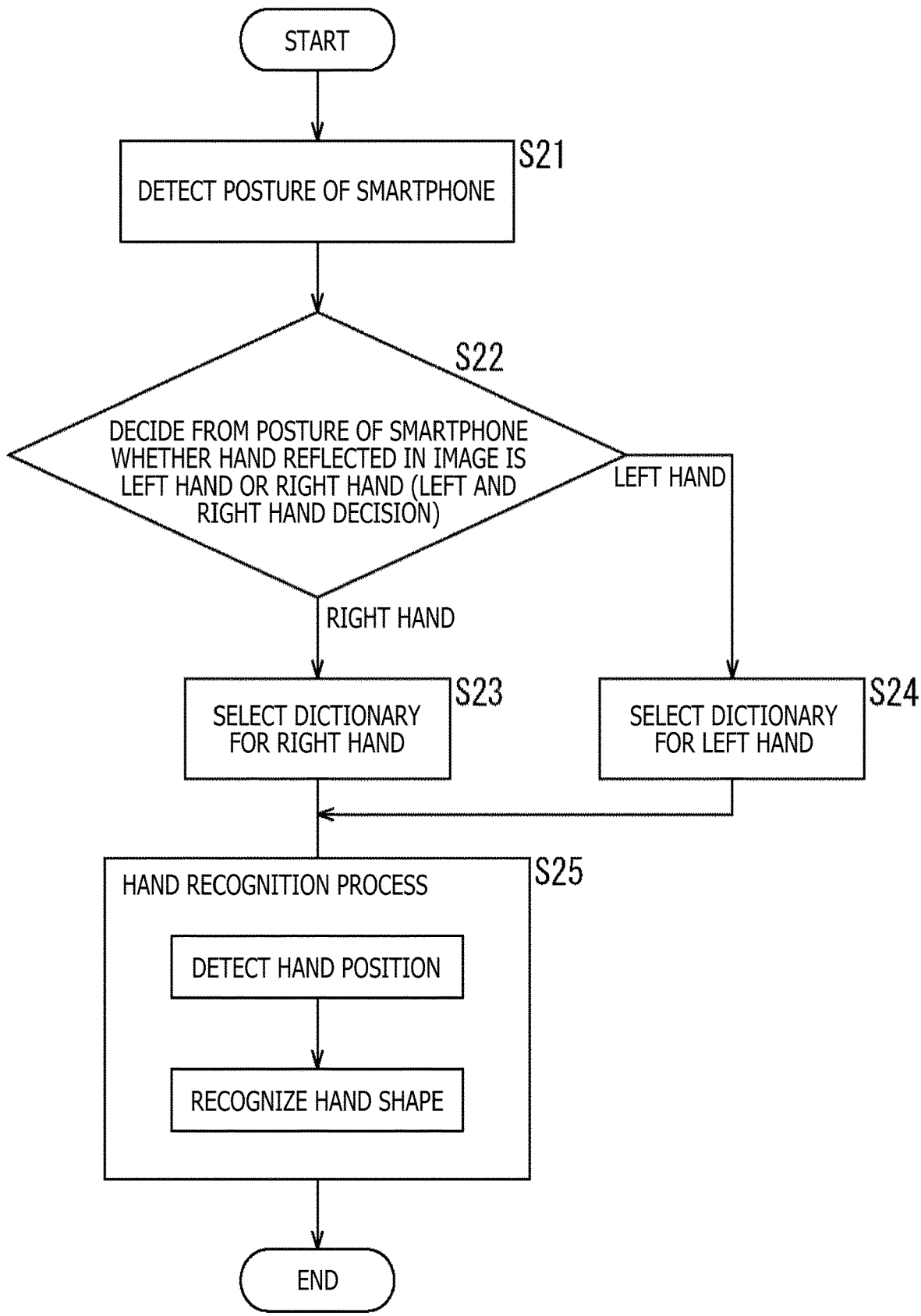
FIG. 15 is a flow chart illustrating an example of processing of the second example of a functional configuration of the smartphone 10.

FIG. 15 is a flow chart illustrating an example of processing of the smartphone 10 of FIG. 14.

In steps S21 and S22, processes similar to those in the case of steps S11 and S12 of FIG. 13 are performed, respectively.

Then, in the case where it is decided in the left and right hand decision in step S22 that the hand reflected in the sensing image is the right hand, the left and right hand decision unit 31 supplies a result of the left and right hand decision representing this to the dictionary selection unit 51. Then, the processing advances to step S23.

In step S23, the dictionary selection unit 51 to which the left and right hand decision result that the hand reflected in the sensing image is the right hand is supplied from the left and right hand decision unit. 31 selects the dictionary for the right hand from between the dictionary for the left hand and the dictionary for the right hand stored in the storage unit 61 as the dictionary for recognition to be used in a hand recognition process. Then, the processing advances to step S25.

In step S25, (the hand position detection unit 41 and the hand shape recognition unit 42 of) the hand recognition processing unit 52 uses the dictionary for the right hand selected as the dictionary for recognition from between the dictionary for the left hand the dictionary for the right hand stored in the storage unit 61 and determines the sensing image supplied from the optical sensor of the sensor unit 14 as a target to perform a hand recognition process similar to that by the hand recognition processing unit 33, Then, the processing is ended therewith.

On the other hand, in the case where it is decided in the left and right hand decision in step 322 that the hand reflected in the sensing image is the left hand, the left and right hand decision unit 31 supplies a left and right hand decision result representing this to the dictionary selection unit 51. Then, the processing advances to step 324.

In step 324, the dictionary selection unit 51 to which the left and right hand decision result that the hand reflected in the sensing image is the left hand is supplied from the left and right hand decision unit 31 selects the dictionary for the left hand from between the dictionary for the left hand and the dictionary for the right hand stored in the storage unit 61 as a dictionary for recognition to be used in a hand recognition process. Then, the processing advances to step S25.

In this case, in step S25, the hand recognition processing unit 52 uses the dictionary for the left hand selected as the dictionary for recognition from between the dictionary for the left hand and the dictionary for the right hand stored in the storage unit 61 and determines the sensing image supplied from the optical sensor of the sensor unit 14 as a target to perform a hand recognition process. Then, the processing ends therewith.

Third Example of Functional Configuration of Smartphone 10

Figure 16:
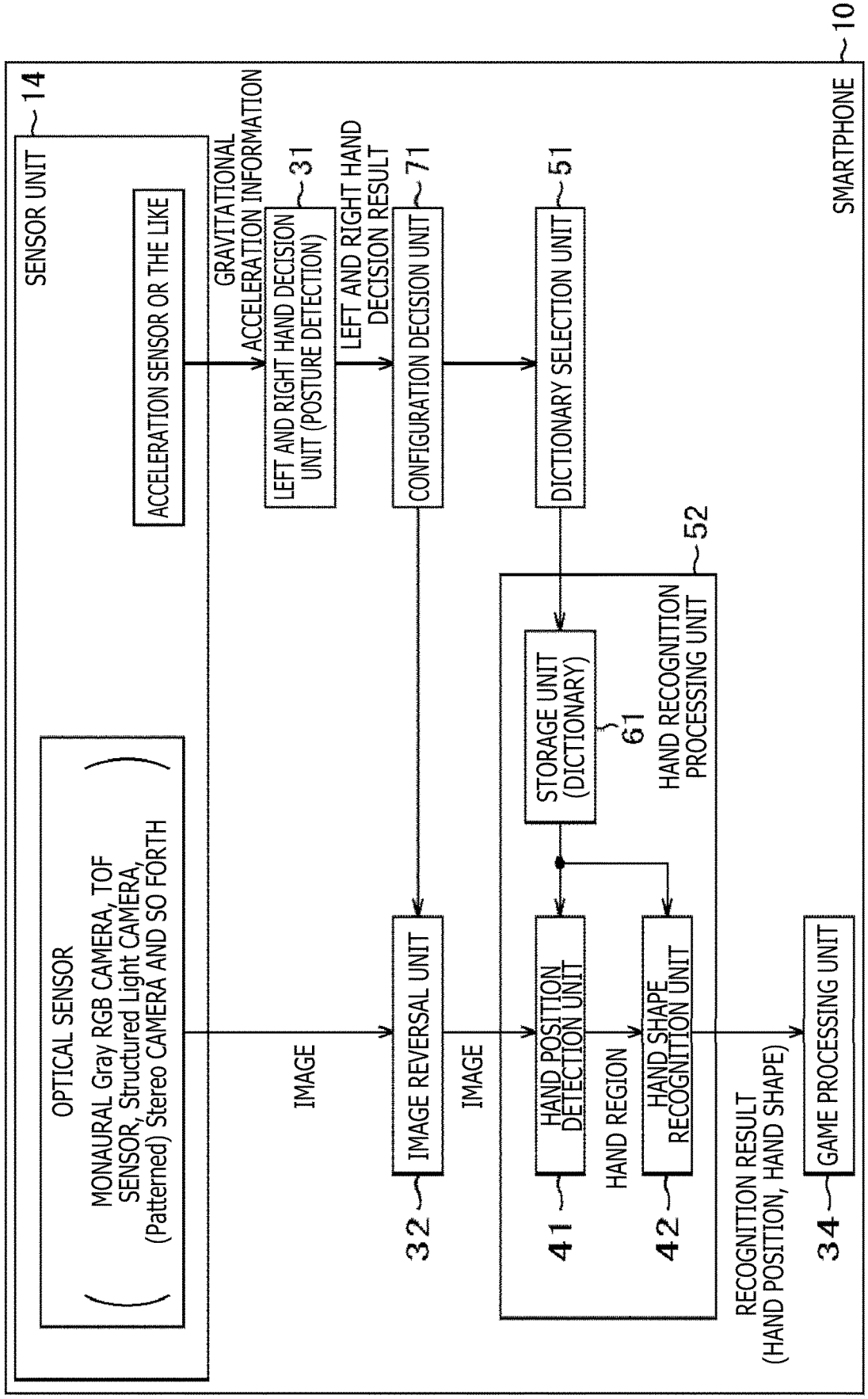
FIG. 16 is a block diagram depicting a third example of a functional configuration of the smartphone 10.

FIG. 16 is a block diagram depicting a third example of a functional configuration of the smartphone 10.

It is to be noted that, in FIG. 16, portions corresponding to those of the case of FIG. 12 or FIG. 14 are denoted by the same reference signs, and description of them is omitted suitably.

In the smartphone 10 of FIG. 16, both of the hand recognition processes of the reversal method and the dictionary selection method are implemented such that a hand recognition process of the reversal method or the dictionary selection method can be performed selectively according to the configuration of the optical sensor of the sensor unit 14.

In particular, in FIG. 16, the smartphone 10 includes a sensor unit 14, a left and right hand decision unit 31, an image reversal unit 32, a game processing unit 34, a dictionary selection unit 51, a hand recognition processing unit 52, and a configuration decision unit 71.

Accordingly, the smartphone 10 of FIG. 16 is the same as that of the case of FIG. 14 in that it includes the sensor unit 14, the left and right hand decision unit 31, the game processing unit 34, the dictionary selection unit 51, and the hand recognition processing unit 52. However, the smartphone 10 of FIG. 16 is different from that of the case of FIG. 14 in that the image reversal unit 32 of FIG. 12 is provided newly and that the configuration decision unit 71 is provided newly.

The configuration decision unit 71 performs configuration decision of deciding whether the configuration of the optical sensor of the sensor unit 14 is a line symmetric configuration or a line asymmetric configuration and controls the image reversal unit 32 and the dictionary selection unit 51 according to a decision result of the configuration decision. (hereinafter referred to also as configuration decision result) and a left and right hand decision result supplied from the left and right hand decision unit 31.

In particular, is the case where the left and right hand decision result represents that the hand reflected in the sensing image is the right hand, the configuration decision unit 71 controls the dictionary selection unit 51 to select the dictionary for the right hand irrespective of the configuration decision result. Further, the configuration decision unit 71 controls the image reversal unit 32 to set the sensing image itself as a target image.

On the other hand, in the case where the left and right hand decision result represents that the hand reflected in the sensing image is the left hand, when the configuration decision result represents that the configuration of the optical sensor is a line symmetric configuration, the configuration decision unit 71 controls the image reversal unit 32 to set a reversal image that is a left-right reversed image of the sensing image as a target image. Further, the configuration decision unit 71 controls the dictionary selection unit 51 to select the dictionary for the right hand.

In the case where the left and right hand decision result represents that the hand reflected in the sensing image is the left hand, when the configuration decision result represents that the configuration of the optical sensor is a line asymmetric configuration, the configuration decision unit 71 controls the dictionary selection unit 51 to select the dictionary for the left hand. Further, the configuration decision unit 71 controls the image reversal unit 32 to set the sensing image itself as a target image.

Figure 17:
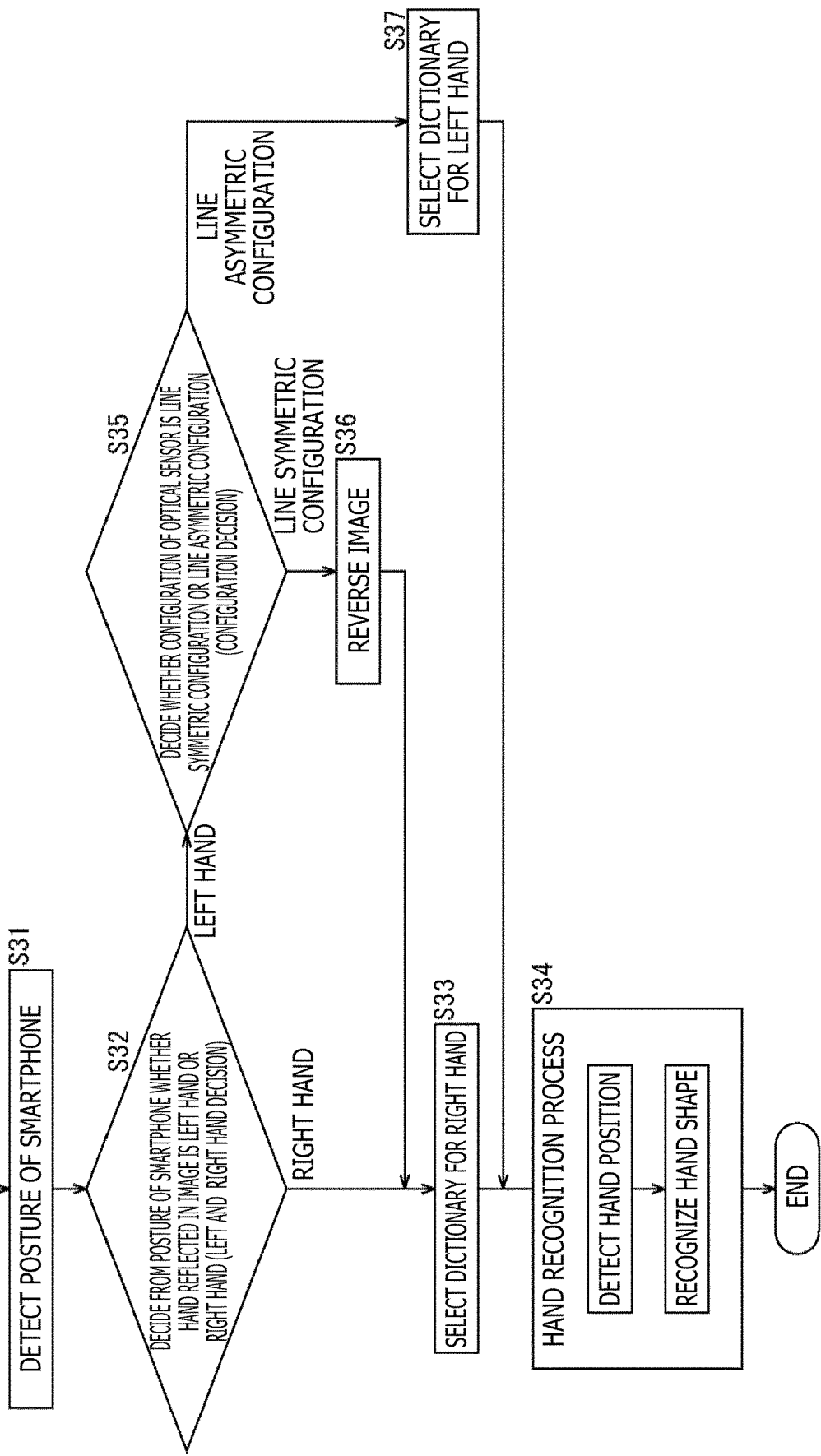
FIG. 17 is a flow chart illustrating an example of processing of the third example of a functional configuration of the smartphone 10.

FIG. 17 is a flow chart illustrating an example of processing of the smartphone 10 of FIG. 16.

In steps S31 and S32, processes similar to those in the case of steps S11 and S12 of FIG. 13 are performed, respectively.

Then, in the case where it is decided in the left and right hand decision in step S32 that the hand reflected in the sensing image is the right hand, the left and right hand decision unit 31 supplies a left and right hand decision result representing this to the configuration decision unit 71. The configuration decision unit 71 to which the left and right hand decision result that the hand reflected in the sensing image is the right hand is supplied from the left and right hand decision unit 31 controls the image reversal unit 32 to set the sensing image itself as a target image. The image reversal unit 32 sets the sensing image itself supplied from the optical sensor of the sensor unit 14 as a target image under the control of the configuration decision unit 71. Then, the image reversal unit 32 supplies the target image to the hand recognition processing unit 52, and the processing advances from step S32 to step S33.

In step S833, the configuration decision unit 71 to which the left and right hand decision result that the hand reflected in the sensing image is the right hand is supplied from the left and right hand decision unit. 31 controls the dictionary selection unit 51 to select the dictionary for the right hand. The dictionary selection unit 51 selects the dictionary for the right hand from between the dictionary for the left hand and the dictionary for the right hand stored in the storage unit 61 as a dictionary for recognition to be used in a hand recognition process under the control of the configuration decision unit 71. Then, the processing advances from step S33 to step S34.

In step S34, the hand recognition processing unit 52 uses the dictionary for the right hand selected as a dictionary for recognition from between the dictionary for the left hand and the dictionary for the right hand stored in the storage unit 61 to perform a hand recognition process for the sensing image supplied as the target image from the image reversal unit 32. Then, the processing ends therewith.

On the other hand, in the case where it is decided in the left and right hand decision in step S32 that the hand reflected in the sensing image is the left hand, the left and right hand decision unit 31 supplies a left and right hand decision result representing this to the configuration decision unit 71. Then, the processing advances to step S35.

In step S35, the configuration decision unit 71 to which the left and right hand decision result representing that the hand reflected in the sensing image is the left hand is supplied from the left and right hand decision unit 31 performs configuration decision of deciding whether the configuration of the optical sensor of the sensor unit 14 is a line symmetric configuration or a line asymmetric configuration.

In the case where it is decided in the configuration decision in step S35 that the configuration of the optical sensor is a line symmetric configuration, the processing advances to step S36, in which the configuration decision unit 71 controls the image reversal unit 32 to left and right reverse the sensing image. The image reversal unit 32 left and right reverses the sensing image supplied from the optical sensor of the sensor unit 14 under the control of the configuration decision unit 71 and sets a reversal image obtained by the left and right reversal as a target image. Then, the image reversal unit 32 supplies the target image to the hand recognition processing unit 52, and the processing advances from step S36 to step S33.

In step S33, the configuration decision unit 71 controls the dictionary selection unit 51 to select the dictionary for the right hand as described hereinabove. The dictionary selection unit 51 selects the dictionary for the right hand from between the dictionary for the left hand and the dictionary for the right hand stored in the storage unit 61 as a dictionary for recognition to be used in a hand recognition process under the control of the configuration decision unit 71. Then, the processing advances from step S33 to step S34.

In step S34, the hand recognition processing unit 52 uses the dictionary for the right hand selected as the dictionary for recognition from between the dictionary for the left hand and the dictionary for the right hand stored in the storage unit 61 to perform a hand recognition process for the reversal image supplied as the target image from the image reversal unit 32. Then, the processing ends therewith.

On the other hand, in the case where it is decided in the configuration decision in step S35 that the configuration of the optical sensor is a line asymmetric configuration, the configuration decision unit 71 controls the image reversal unit 32 to set the sensing image itself as a target image. The image reversal unit 32 sets the sensing image itself supplied from the optical sensor of the sensor unit 14 as a target image under the control of the configuration decision unit 71. Then, the image reversal unit 32 supplies the target image to the hand recognition processing unit 52, and the processing advances from step S35 to step S37.

In step S37, the configuration decision unit 71 controls the dictionary selection unit 51 to select the dictionary for the left hand. The dictionary selection unit 51 selects the dictionary for the left hand from between the dictionary for the left hand and the dictionary for the right hand stored in the storage unit 61 as a dictionary for recognition to be used in a hand recognition process under the control of the configuration decision unit 71. Then, the processing advances from step S37 to step S34.

In step 337, the hand recognition processing unit 52 uses the dictionary for the left hand selected as the dictionary for recognition from between the dictionary for the left hand and the dictionary for the right hand stored in the storage unit 61 to perform a hand recognition process for the sensing image supplied as the target image from the image reversal unit 32. Then, the processing ends therewith.

As above, in the smartphone 10 of FIG. 16, a hand recognition process of the reversal method or the dictionary selection method is selectively performed according to the configuration of the optical sensor of the sensor unit 14.

In particular, in the case where the configuration of the optical sensor is a line symmetric configuration, as a hand recognition process for the right hand, a hand recognition process for a sensing image is performed using a dictionary for one hand, for example, the dictionary for the right hand. Further, as a hand recognition process for the left hand, a hand recognition process for a reversal image obtained by left and right reversal of the sensing image is performed using a dictionary for one hand (here, the dictionary for the right hand) to be used in a hand recognition process for the right hand.

On the hand, in the case where the configuration of the optical sensor is a line asymmetric configuration, as the hand recognition process for the right hand, a hand recognition process for the sensing image is performed using the dictionary for the right hand. Further, as the hand recognition process for the left hand, a hand recognition process for the sensing image is performed using the dictionary for the left hand.

Accordingly, a hand recognition process of an appropriate method can be performed according to the configuration of the optical sensor.

It is to be noted that the present technology can be applied not only to a smartphone but also to a tablet, a game machine for exclusive use, and other portable terminals.

Further, the embodiment of the present technology is not limited to the embodiment described hereinabove and can be altered in various manners without departing from the subject matter of the present technology.

For example, the present technology can take a configuration for cloud computing in which one function is shared and cooperatively processed by a plurality of apparatuses through a network.

Further, the steps described hereinabove in connection with the flow charts not only can be executed by a single apparatus but also can be shared and executed by a plurality of apparatuses.

Further, in the case where one step includes a plurality of processes, the plurality of processes included is the one step not only can be executed by a single apparatus but also can be shared and executed by a plurality of apparatuses.

Further, the advantageous effects described in the present specification are exemplary to the last and are not restrictive, and other advantageous effects may be available.

It is to be noted that the present technology can take the following configurations.

<1>

A program for causing a computer to function as:

a hand recognition processing unit configured to perform, as a hand recognition process for recognizing, according to a posture of a portable terminal including an optical sensor that receives light, a hand reflected in an image obtained by sensing of the optical sensor, a hand recognition process for a left hand or a hand recognition process for a right hand.

<2>

The program according to <1>, in which the hand recognition processing unit performs the hand recognition process for the left hand or the hand recognition process for the right hand according to a direction of the portable terminal with respect to a direction of a gravitational acceleration.

<3>

The program according to <2>, is which the hand recognition processing unit performs the hand recognition process for the right hand in a case where the direction of the portable terminal is a direction in which a right portion of the portable terminal is directed in the direction of the gravitational acceleration, and performs the hand recognition process for the left hand in a case where the direction of the portable terminal is a direction is which a left portion of the portable terminal is directed in the direction of the Gravitational acceleration.

<4>

The program according to any one of <1> to <3>, in which the hand recognition process for the left hand is a hand recognition process that uses a dictionary for the left hand, and the hand recognition process for the right hand is a hand recognition process that uses a dictionary for the right hand.

<5>

The program according to <4>, in which the optical sensor is configured in a line asymmetric configuration by which an imaging target image obtained by sensing a predetermined imaging target by the portable terminal in a predetermined posture and an imaging target image obtained by sensing an imaging target line symmetric to the predetermined imaging target by the portable terminal in a posture line symmetric to the predetermined posture are not line symmetric to each other.

<6>

The program according to any one of <1> to <3>, in which the hand recognition process for the left hand is a hand recognition process for one of the image and a reversal image that is a left-right reversed image of the image, and the hand recognition process Los the right hand is a hand recognition process for the other of the image and the reversal image.

<7>

The program according to <6>, in which
the optical sensor is configured is a line symmetric configuration by which.
   an imaging target image obtained by sensing a predetermined imaging target by the portable terminal in a predetermined posture and
   an imaging target image obtained by sensing an imaging target line symmetric to the predetermined imaging target by the portable terminal in a posture line symmetric to the predetermined posture
   are line symmetric to each other.

<8>

The program according to any one of <1> to <3>, in which,
   according to a configuration of the optical sensor, either
   a hand recognition process of a dictionary selection method for performing, as the hand recognition process for the left hand, a hand recognition process that uses a dictionary for the left hand and performing, as the hand recognition process for the right hand, a hand recognition process that uses a dictionary for the right hand is performed, or
   a hand recognition process of a reversal method for performing, as the hand recognition process for the left hand, a hand recognition process for one of the image and a reversal image that is a left-right reversed image of the image and performing, as the hand recognition process for the right hand, a hand recognition process for the other of the image and the reversal image is performed.

<9>

A recognition apparatus including:
   a hand recognition processing unit configured to perform, as a hand recognition process for recognizing, according to a posture of a portable terminal including an optical sensor that receives light, a hand reflected in an image obtained by sensing of the optical sensor, a hand recognition process for a left hand or a hand recognition process for a right hand.

<10>

A recognition method including a step of:
   performing, as a hand recognition process for recognizing, according to a posture of a portable terminal including an optical sensor that receives light, a hand reflected in an image obtained by sensing of the optical sensor, a hand recognition process for a left hand or a hand recognition process for a right hand.

REFERENCE SIGNS LIST

10 Smartphone, 11 CPU, 12 ROM, 13 RAM, 14 Sensor unit, 15 Input/output interface, 16 Display unit, 17 Touch inputting unit, 18 Communication unit, 19 Home button, 31 Left and right hand decision unit, 32 Image reversal unit, 33 Hand recognition processing unit, 34 Game processing unit, 41 Hand position detection unit, 42 Hand shape recognition unit, 43 Storage unit, 51 Dictionary selection unit, 52 Hand recognition processing unit, 61 Storage unit, 71 Configuration decision unit

The invention claimed is:

1. A non-transitory computer-readable medium having embodied thereon a program, which when executed by a computer causes the computer to execute a recognition method, the method comprising:
   determining, according to a posture of a portable terminal including an optical sensor that receives light, whether a hand reflected in an image obtained by sensing of the optical sensor is a left hand or a right hand; and
   performing, as a hand recognition process for recognizing the hand reflected in the image, a hand recognition process for the left hand, based on determining the hand as the left hand and a hand recognition process for the right hand, based on determining the hand as the right hand, wherein
   the hand recognition process for the left hand is a hand recognition process that uses a dictionary for the left hand,
   the hand recognition process for the right hand is a hand recognition process that uses a dictionary for the right hand, the dictionary for the left hand being different than the dictionary for the right hand, and
   according to a configuration of the optical sensor a hand recognition process of a dictionary selection method for performing, as the hand recognition process for the left hand, a hand recognition process that uses the dictionary for the left hand and performing, as the hand recognition process for the right hand, a hand recognition process that uses the dictionary for the right hand is performed.

2. The non-transitory computer-readable medium according to claim 1, wherein the executed method further comprises
   performing the hand recognition process for the left hand or the hand recognition process for the right hand according to a direction of the portable terminal with respect to a direction of a gravitational acceleration.

3. The non-transitory computer-readable medium according to claim 2, wherein the executed method further comprises:
   performing the hand recognition process for the right hand in a case where the direction of the portable terminal is a direction in which a right portion of the portable terminal is directed in the direction of the gravitational acceleration; and
   performing the hand recognition process for the left hand in a case where the direction of the portable terminal is a direction in which a left portion of the portable terminal is directed in the direction of the gravitational acceleration.

4. The non-transitory computer-readable medium according to claim 1, wherein
   the optical sensor is configured in a line asymmetric configuration by which an imaging target image obtained by sensing a predetermined imaging target by the portable terminal in a predetermined posture and an imaging target image obtained by sensing an imaging target line symmetric to the predetermined imaging target by the portable terminal in a posture line symmetric to the predetermined posture are not line symmetric to each other.

5. The non-transitory computer-readable medium according to claim 1, wherein
   the hand recognition process for the left hand is a hand recognition process for one of the image and a reversal image that is a left-right reversed image of the image, and
   the hand recognition process for the right hand is a hand recognition process for the other of the image and the reversal image.

6. The non-transitory computer-readable medium according to claim 5, wherein the optical sensor is configured in a line symmetric configuration by which an imaging target image obtained by sensing a predetermined imaging target by the portable terminal in a predetermined posture and an imaging target image obtained by sensing an imaging target line symmetric to the predetermined imaging target by the portable terminal in a posture line symmetric to the predetermined posture are line symmetric to each other.

7. A recognition apparatus comprising:

circuitry configured to:

determine, according to a posture of a portable terminal including an optical sensor that receives light, whether a hand reflected in an image obtained by sensing of the optical sensor is a left hand or a right hand; and perform, as a hand recognition process for recognizing the hand reflected in the image, a hand recognition process for the left hand, based on determining the hand as the left hand and a hand recognition process for a right hand, based on determining the hand as the right hand, wherein the hand recognition process for the left hand is a hand recognition process that uses a dictionary for the left hand, the hand recognition process for the right hand is a hand recognition process that uses a dictionary for the right hand, the dictionary for the left hand being different than the dictionary for the right hand, and according to a configuration of the optical sensor a hand recognition process of a dictionary selection method for performing, as the hand recognition process for the left hand, a hand recognition process that uses the dictionary for the left hand and performing, as the hand recognition process for the right hand, a hand recognition process that uses the dictionary for the right hand is performed.

8. A recognition method comprising:

determining, according to a posture of a portable terminal including an optical sensor that receives light, whether a hand reflected in an image obtained by sensing of the optical sensor is a left hand or a right hand; and performing, as a hand recognition process for recognizing the hand reflected in the image, a hand recognition process for the left hand, based on determining the hand as the left hand and a hand recognition process for the right hand, based on determining the hand as the right hand, wherein the hand recognition process for the left hand is a hand recognition process that uses a dictionary for the left hand, the hand recognition process for the right hand is a hand recognition process that uses a dictionary for the right hand, the dictionary for the left hand being different than the dictionary for the right hand, and according to a configuration of the optical sensor a hand recognition process of a dictionary selection method for performing, as the hand recognition process for the left hand, a hand recognition process that uses the dictionary for the left hand and performing, as the hand recognition process for the right hand, a hand recognition process that uses the dictionary for the right hand is performed.

\* \* \* \* \*